United States Patent [19]
Jamison

[11] 3,962,705

[45] June 8, 1976

[54] RADAR MICROWAVE LOBING SYSTEMS

[75] Inventor: Richard S. Jamison, Los Angeles, Calif.

[73] Assignee: Hughes Aircraft Company, Culver City, Calif.

[22] Filed: Feb. 1, 1963

[21] Appl. No.: 256,197

[52] U.S. Cl. .............................. 343/16 M; 333/10; 333/11; 333/98 S
[51] Int. Cl.$^2$ ...................... G01S 9/22; H01P 5/16; H01P 5/18
[58] Field of Search ................. 343/16, 16:1, 16 M; 333/10, 11, 98 S, 31 A

[56] References Cited
UNITED STATES PATENTS

| | | | |
|---|---|---|---|
| 694,044 | 11/1950 | Abstract | 333/98 S |
| 2,679,631 | 5/1954 | Korman et al. | 333/10 |
| 2,855,677 | 5/1959 | Zaleski | 333/98 S |
| 2,941,165 | 6/1960 | Broussaud | 333/11 |
| 2,948,863 | 8/1960 | Honda | 333/10 |
| 2,991,471 | 7/1961 | Pritchard | 331/11 |
| 3,058,071 | 10/1962 | Walsh et al. | 333/11 |

Primary Examiner—Malcolm F. Hubler
Attorney, Agent, or Firm—Walter J. Adam; W. H. MacAllister

EXEMPLARY CLAIM

4. A radar system responsive to unmodulated elevation error signals, azimuth error signals and sum signals comprising a modulator responsive to the elevation and azimuth error signals coupled in space quadrature for rotating said error signals at a predetermined velocity and including a plane of acceptance for polarizing the rotating error signals as modulated error signals, first and second hybrid means each having first and second input and output sections, the first input of said first hybrid means coupled to said modulating means for receiving the modulated error signals, the first and second outputs of said first hybrid means respectively coupled to said first and second inputs of said second hybrid means, said first and second hybrid means each having a pair of movable ports for selectively preventing division of energy therein, a dissipative load coupled to the first output of said second hybrid means, circulating means having first, second, third and fourth ports with the second port responsive to said sum signals, the third port coupled to the second input of said first hybrid means and the fourth port coupled to the second output of said second hybrid means, and signal processing means coupled to the first port of said circulating means.

13 Claims, 10 Drawing Figures

Richard S. Jamison,
INVENTOR.

BY

Walter J. Adam
ATTORNEY

Richard S. Jamison
INVENTOR

BY

Walter J Adam
ATTORNEY

RADAR MICROWAVE LOBING SYSTEMS

This invention relates to radar systems and particularly to an improved radar system utilizing a monopulse antenna and developing modulation on reception of the echo signals at microwave frequency to provide lobing in a simplified and improved manner.

In prior art monopulse radar systems, target angular coordinates have been obtained by combining the radio or microwave frequency echo signals received in four horns of a nonrotating monopulse antenna into sum and difference signals which are then heterodyned to intermediate frequency signals. Separate IF (intermediate frequency) amplifier channels are then utilized and the signals are detected to obtain a measure of the relative amplitudes and the angular displacement of the antenna axis from the source of signals. This type of arrangement provides problems in matching the IF amplifier channels in both phase and gain as well as providing a relatively complex system. Also this type of arrangement is highly sensitive to noise and interference such as jamming signals. Some systems provide multiplexing schemes at the intermediate frequency portion so as to utilize a common amplifier, but these arrangements have the disadvantage of complexity and a high degree of susceptibility to jamming. Conventional conical scan antenna systems have the disadvantage of being highly susceptible to enemy jamming as lobing of the energy is performed during both transmitting and receiving.

Radar systems that provide lobing of the received echo signals to prevent external detection of the lobing frequency and that modulate and combine the input signals into a common signal at radio or microwave frequency have the advantage of being relatively unsusceptible to angle deception jamming and of utilizing a single IF amplifier strip. One such radar system is disclosed in my copending application Ser. No. 249,557, entitled "Lobing System", filed Jan. 2, 1963. This type of system also provides simplified selection of search and track operation and variation of the lobing frequency. Relatively complicated systems have been developed utilizing this lobing on reception principle and have been found to be highly reliable. However some systems utilizing this lobing or reception principle have been found to have a relatively high energy loss.

It is therefore an object of this invention to provide a simplified and highly reliable radar system that performs lobing of the received echo signal at radio or microwave frequency with a minimum of energy loss.

It is a further object of this invention to provide a simplified radar modulating system utilizing hybrid junctions and circulators for combining the informational signals into a common signal for amplification.

It is a still further object of this invention to provide a radar lobing system utilizing circulators while having relatively small energy losses.

It is another object of this invention to provide a simplified system for terrain avoidance operation.

It is still another object of this invention to provide an arrangement that selectively operates as a radar system or a terrain avoidance system.

It is another object of this invention to provide a radar system that provides a plurality of variable features for overcoming undesired interfering signals and for selecting operations such as searching and tracking.

It is another object of this invention to provide a simplified radar system for controlling transmission and reception having a single waveguide connecting the lobing portion, which may be attached to the antenna, with the transmit-receive unit so that only one rotary joint is required.

It is another object of this invention to provide an improved combination of hybrid junctions and phase shifters or attenuators for summing of microwave signals.

According to one feature of this invention, the radar system includes a sum and difference network coupled to a conventional monopulse type antenna. The difference signals or error signals are applied to a modulator in space quadrature with electrical vectors in a direction transverse to the direction of propagation polarized at right angles to each other. A rotating magnetic field in the modulator causes any energy that is in line with this field to be continually rotated and applied to a coupler that is sensitive to only waves of a fixed polarization. The polarized and modulated azimuth and elevation error signals in phase quadrature are then applied from the modulator to first and second hybrid junctions connected in series. A sum signal is applied from the sum and difference network through a circulator and in turn to a second input of the first hybrid. A phase shifter or attenuator is provided between the first and second hybrids so that a combined sum and error signal is applied to a first output of the second hybrid. By selectively opening and closing the apertures of the first and second hybrids, selected amounts of sum signal and error signals may be combined for tracking and anti-jam modes of operation. A transmitting and receiving unit is also coupled to the circulator for transmitting energy through the sum and difference network. The combined signal is applied to the transmit-receive unit in one arrangement in accordance with this invention through the circulator and in another arrangement through a separate waveguide. During search the apertures between the two portions of the hybrid junctions are both closed so that only unmodulated sum energy is passed therethrough. The system provides a simplified selection of the modulating or lobing frequency by controlling the velocity of the rotating magnetic field at the modulator. Also the system in accordance with this invention may be utilized in an improved arrangement for terrain avoidance operation by properly controlling the modulator. In my above-mentioned copending application, a terrain avoidance processor of a suitable type is fully described.

The novel features of this invention, as well as the invention itself, both as to its organization and method of operation, will best be understood from the accompanying description, taken in connection with the accompanying drawings, in which like reference characters refer to like parts, and in which.

Figure 1:
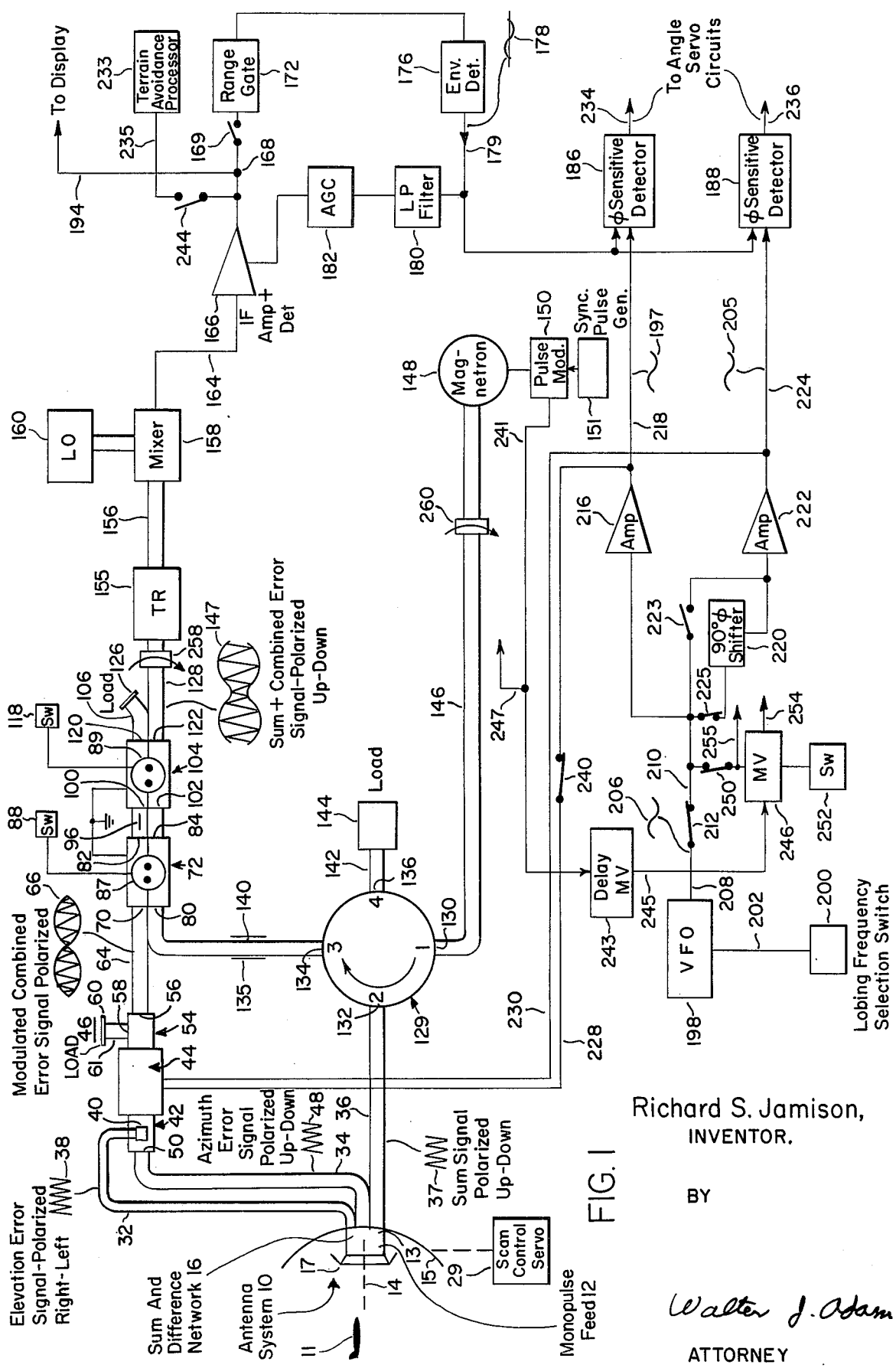
FIG. 1 is a schematic and block diagram of a first radar and terrain avoidance system in accordance with this invention.

Referring first to FIG. 1, a schematic and block diagram is shown of a radar system in accordance with this invention when operating as a conventional pulse radar system. The operation of the system in accordance with this invention is similar for continuous wave signals and the principles of the invention are equally applicable to both pulsed and continuous wave operation. A monopulse antenna system 10 receives echo signals reflected from an object in space such as a craft 11 in a monopulse feed 12 which may have four feed horns or apertures such as apertures 13. A plate 17 may be provided to direct the energy into the apertures 13. The antenna system 10 may have a central axis 14 indicative of the axis of a parabollic reflector or dish 15. The axis 14 is coincident with the boresight axis of the antenna system 10. The signals intercepted by the group of apertures 13 have relative amplitudes which together are indicative of the azimuth and elevation direction of a target in relation to the axis 14. These signals are passed through a sum and difference network 16 which may, for example, be a conventional network including a plurality of magic tees.

It is to be noted that, the error signals change polarity for signals above and below the axis 14 in the vertical plane and for signals to the right and left of the axis 14 in the azimuth plane. These polarity changes and others in the waveguides determine the polarities for any quadrant in space relative to the axis 14.

The antenna system 10 may scan in response to a scan control servo 29 which may provide, for example, a rectangular scan pattern during search operation and azimuth scanning during terrain avoidance operation. During tracking, the scan control servo 29 may be controlled in response to processed error signals.

Thus the sum and difference network 16 in response to the intercepted signals from the apertures 13 develop an elevation difference error signal which is applied to a rectangular waveguide 32, an azimuth difference error signal which is applied to a rectangular waveguide 34 and a sum or reference signal which is applied to a rectangular waveguide 36. The two error signals and sum signal are all at radio or microwave frequency or other high frequency as determined by the transmitted frequency.

The elevation error signal shown by a waveform 38 and having electric vectors polarized in a first direction which is right-left looking into a cross section of the waveguide in the plane of the figure, is applied through the waveguide 32 to a first input waveguide section 40 of an orthogonal mode transducer or coupler 42 included in a modulator 46. The elevation error signal is then applied to a modulating or field section 44 of the modulator 46 polarized horizontally or right-left or a plane transverse to the logititudinal axis of the waveguide. The azimuth error signal shown by a waveform 48 and having electrical vectors polarized up-down is applied through the waveguide 34 to a waveguide section 50 of the coupler 42 and applied into the modulating section 44 polarized up-down or at right angles to the elevation error signal. Thus the elevation error and the azimuth error signals are applied to the modulating section 44 in space quadrature.

The modulator 46 may be a ferrite modulator having a circular section of waveguide that contains a rotating magnetic field. A comprehensive description of such a modulator is set forth in my above-mentioned copending application. Any energy that is in line with such a field will be continuously rotated at the output and components having electric vectors 90 degrees from the plane of the magnetic field are not affected. The output energy of the circular modulating section 44 is applied to a rectangular waveguide section 56 of an orthogonal mode transducer or coupler 54 that accepts only output energy that is in line with its narrow dimension. The component of energy that is not accepted by the rectangular waveguide 56 has a 90 degree polarization angle relative to the accepted energy and is applied to a second rectangular waveguide section 58 for dissipation in a dummy load 60. Thus the modulated combined error signal of a waveform 66 is applied to a waveguide 64, being amplitude modulated at a frequency dependent on the frequency of rotation of the magnetic field of the modulator 46. The modulated signal of the waveform 66 is then applied to a first input terminal or input opening 70 of a first hybrid junction 72.

Figure 3:
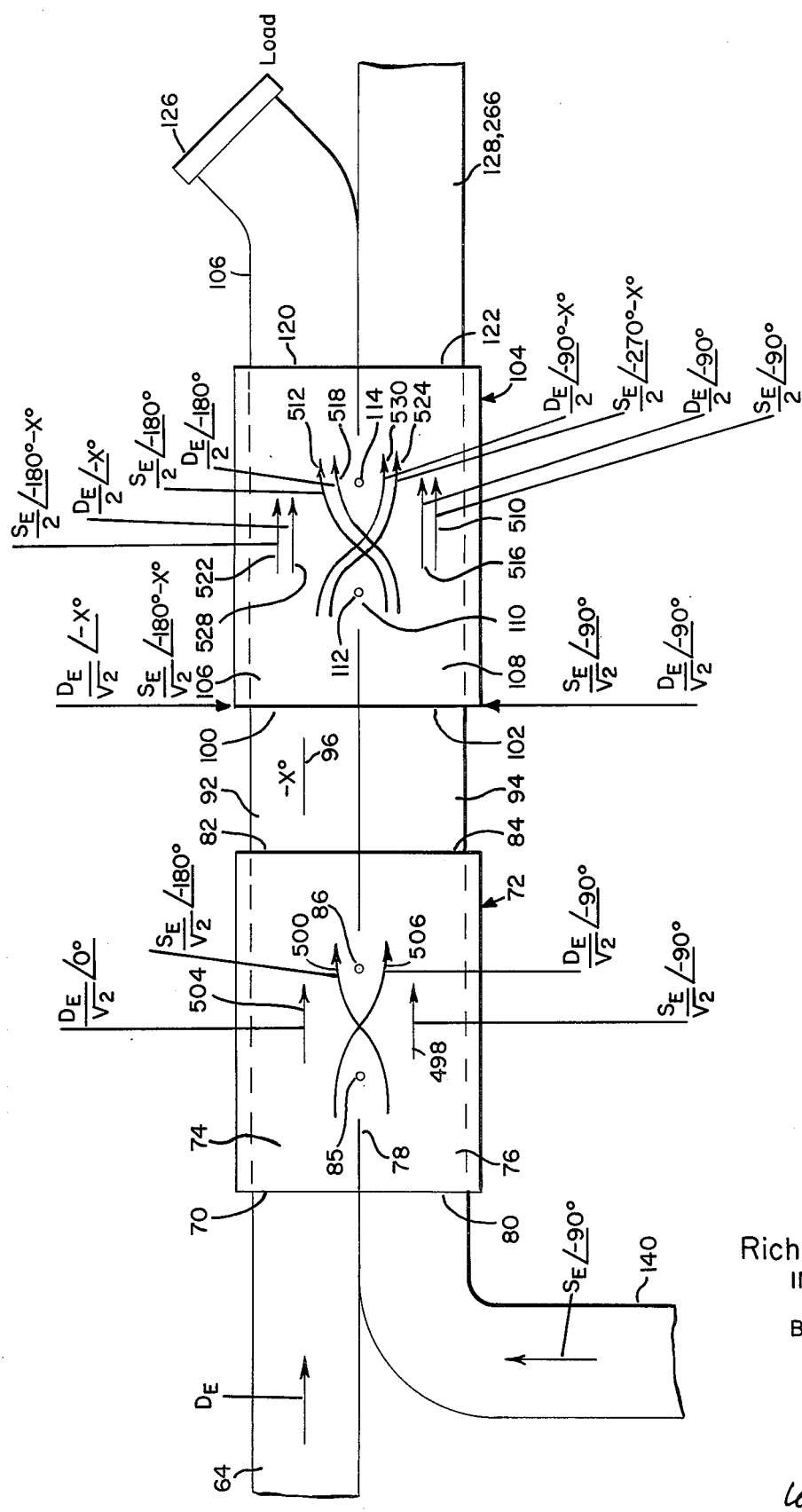
FIG. 3 is an enlarged view of the hybrid junction arrangements of FIGS. 1 and 2 for explaining the operation with a phase shifter included therein.
Figure 4:
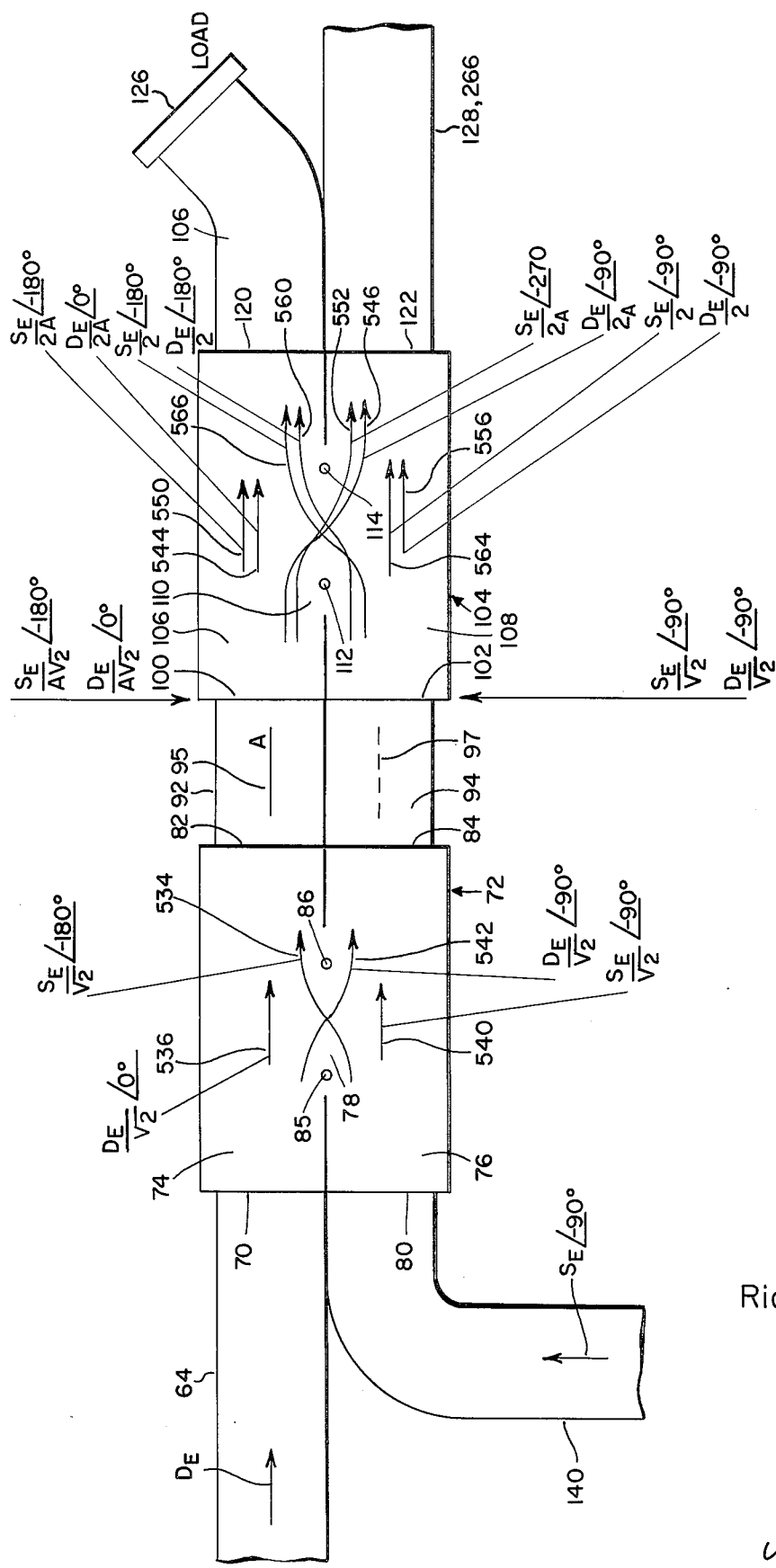
FIG. 4 is an enlarged view of the hybrid junction arrangements of FIGS. 1 and 2 for explaining the operation with an attenuator included therein.

Referring now also to the enlarged views of the hybrid junction arrangements of FIGS. 3 and 4, as well as to FIG. 1, the first hybrid junction 72 includes first and second parallel rectangular waveguide sections 74 and 76 having a common wall therebetween with an aperture 78 therein. The hybrid junction 72 has two input terminals 70 and 80 and two output terminals 82 and 84 with the terminals 70 and 82 at opposite ends of the rectangular waveguide section 74 and the terminals 80 and 84 at opposite ends of the rectangular waveguide section 76. The aperture 78 includes a pair of posts 85 and 86 which may be inserted to close the aperture in response to a switch 88 controlling a solenoid 87 or removed therefrom to provide energy division through the aperture. Connected to the output terminals 82 and 84 are respective rectangular waveguide sections 92 and 94 which may have a common wall. Positioned in the waveguide section 92 is a dielectric sheet or plate 96 to provide a desired phase shift. The plate 96, or plate 95 of FIG. 4, may also be a resistive sheet to provide a desired attenuation as will be discussed in further detail subsequently. As shown in FIG. 4, the resistive sheet or plate 95 is positioned in the waveguide 92 and to cancel any undesired phase shift of the sheet 95 a phase shifter 97 shown dotted may be positioned in the waveguide 94.

Connected to the two waveguide sections 92 and 94 are respective input terminals 100 and 102 of a second hybrid junction 104. Similar to the first hybrid junction, the second hybrid junction 104 includes first and second waveguide sections 106 and 108 separated by a common wall having an aperture 110 therein. Posts 112 and 114 are provided in the aperture 110 for being inserted or withdrawn in response to a switch 118 controlling a solenoid 89. A first output terminal 120 is connected to the waveguide section 106 and a second output terminal 122 is connected to the waveguide 128. A suitable dissipative load 126 is connected to the output terminal 120.

The system in accordance with this invention includes a circulator 129 as seen in FIG. 1 which may be a conventional four port ferrite circulator. The circulator 129 may include first, second, third and fourth ports 130, 132, 134 and 136. The second port 132 may be coupled to the waveguide 36 and the third port 134 coupled through a waveguide 140 to the second input terminal 80 of the first hybrid junction 72. The fourth port may be coupled to a waveguide 142 which in turn is coupled to a microwave dissipative load 144 and the first port 130 may be coupled to a waveguide 146. An adjustable shim or length adjusting arrangement 135 is included in the waveguide 140 for providing a desired 90 degrees phase shift of the sum signal, as will be further explained. Also the shim 135 provides an adjustment for manufacturing tolerances in the length of the waveguides. The shim 135 may be a piece of U-shaped waveguide with adjustable flanges at the ends thereof to allow adjustment without disturbing the position of other system elements.

During reception, the sum signal of the waveform 37 is applied to the port 132, circulated to the port 134 and applied through the waveguide 140 to the input terminal 80 of the hybrid junction 72. At the same time the modulated error signal information of the waveform 66 is applied to the input terminal 70 to be summed with the sum signal by the energy division at the aperture 78, reference FIGS. 3 and 4, which summed signal of a waveform 147 is, as seen in FIG. 1, applied to the waveguide 128 when the aperture 110 of FIGS. 3 and 4 is closed. When the aperture 110 is open the portion of the energy in the waveguide section 92 is either phase shifted by the dielectric sheet or plate 96 of FIG. 3 or attenuated by the resistive sheet or plate 95 of FIG. 4 and the energy is applied to the hybrid junction 104 from which a summed signal of the waveform 147 is applied to the waveguide 128. As will be discussed in further detail subsequently, both apertures 78 and 110 are closed during a search operation so that only the sum signal of the waveform 37 is applied to the waveguide 128. The aperture 78 is open and the aperture 110 is closed during normal tracking operation so that approximately one half of the sum and error energy are combined; both apertures 78 and 110 are opened during anti-jam operation so that principally error signal energy is applied to the waveguide 128.

The distance between the four apertures 13 of the antenna system 10 to the summing point at the aperture 78 of the hybrid junction 72 must be equal for all energy paths except for the 90 degree phase shift of the shim 135, so that all signals are summed with a correct phase relation. These three paths include the elevation error signal path through the waveguide 32, the modulator 46 and the waveguide 64 to the aperture 78, the azimuth error signal path through the waveguide 34, the modulator 46 and the waveguide 64 to the aperture 78 and the sum signal path through the waveguide 36, the circulator 98 and the waveguide 140 to the aperture 78.

During transmission, energy developed by a magnetron 148 is applied through the waveguide 146 to the circulator 129, to the port 132 of the circulator 129, to the waveguide 36 and through the sum and difference network 16 to be transmitted from the dish 15 into space. The transmit-receive portion of the system includes a pulse modulator 150 responding to signals from a synchronizing pulse generator 151 and coupled to the magnetron 148 to provide control pulses (not shown) so that the magnetron applies pulsed bursts of energy to the circulator 129. It is to be noted that for C.W. (continuous wave) operation in accordance with this invention, the magnetron 116 may be continually operating.

During reception the common signal of the waveform 147 is as seen in FIG. 1 applied through the waveguide 128 to a transmit-receive tube 155. A conventional gas type tube may be utilized for the T-R tube 155 to prevent higher level transmitted energy from passing therethrough. The transmit-receive tube 155 is required to prevent reflections damaging the sensitive mixer crystals which may result from mismatched impedances in the microwave portion of the system.

The intercepted energy passed through the transmit-receive tube 155 is applied through a waveguide 156 to a mixer 158 controlled by a local oscillator 160 to apply signals at intermediate frequency to a lead 164. The common IF (intermediate frequency) signal on the lead 164 is applied to a common IF amplifier 166 thus eliminating the well known phase and amplitude balancing problems associated with a conventional plurality of parallel IF amplifiers. The IF amplifier 166 may include a conventional detector as is well known in the art.

The amplified and detected signal at radio frequency from the IF amplifier 166 is passed through a lead 168 to a range gate 172 which, as is well known in the art, may provide time discrimination of the detected signal in response to conventional range circuits (not shown). The common video signal passed through the range gate 172 is then passed to a conventional box car envelope detector 176 which shifts the carrier wave or the sum signal to a DC (direct current) signal for providing a DC reference level of a waveform 178 while retaining the sideband information at the amplitude modulation frequency of the envelope of the common signal similar to the waveform 147. The DC signal of the waveform 178 is then passed through a low pass filter 180 which essentially passes only the DC signal to an automatic gain control (AGC) circuit 182. The automatic gain control circuit 182 acts in a conventional manner to vary the amplification of the IF amplifier 166 so as to normalize the amplification in response to the varying peak amplitude of the DC reference or sum signal. Thus the sum signal of the waveform 37 is utilized to provide the reference amplitude for the error signals developed by the sum and difference network 16. The detected sideband error signal of the waveform 178 is passed simultaneously to phase sensitive detectors 186 and 188. For search operation, the video frequency signal is applied from the lead 168 to a lead 194 and a switch 169 in the lead 168 is opened. The sum signal on the lead 194 may be applied to a display system (not shown). Also during tracking and anti-jam operation, the signal on the lead 168 may be passed to the display system.

In order to provide a variable lobing or modulation frequency to the system, a suitable source of AC (alternating current) signals is provided such as a variable frequency oscillator 198 controlled by a lobing frequency selection switch 200 through a lead 202. The switch 200 may control the reactance of the variable frequency oscillator 198, for example. The oscillator 198 applies a reference signal of a waveform 206 to a lead 208 having a frequency determined by the selection switch 200 to provide a varying lobing frequency to overcome the effect of interfering signals such as angle deception jamming signals intercepted by the antenna. The signals on the lead 208 are applied to a lead 210 through a switch 212 and through a first power amplifier 216 to a lead 218. Also signals are applied from the lead 210 through a 90 degrees phase shifter 220 and through a second power amplifier 222 to a lead 224. The reference and modulation control signals of waveforms 197 and 205 on the respective leads 218 and 224 are applied through respective leads 228 and 230 to the polyphase ferrite rotating field section 44 of the modulator 46 as well as being respectively applied to the phase sensitive detectors 186 and 188. In response to the reference signals on the leads 218 and 224 the respective phase sensitive detectors 186 and 188 each separate the in phase elevation and azimuth error components from the detected error signal of the waveform 178 so as to develop DC output signals (not shown) on output leads 234 and 236.

The DC output signals have voltage levels indicative of the relative peak amplitudes of the modulated elevation and azimuth error signal components of the envelope detected error signal of the waveform 178. The DC error signals on the leads 234 and 236 are then passed to angle servo circuits (not shown) which may act to control the guidance of a craft or the direction of the antenna, for example.

In terrain avoidance operation in accordance with this invention only the elevation error signal of the waveform 38 is effective as the azimuth energy is dissipated in the load 60. As explained fully in my copending application cited above, the elevation energy is continually inverted by driving the modulator 46 with a square wave having selected positive and negative amplitudes. A switch 240 is provided in the lead 228 so as to disconnect one square wave signal during terrain avoidance operation.

A terrain avoidance processor 233 may be coupled by a lead 235 through a switch 244 to the lead 168. The processor 233 may be of the type disclosed in the above cited patent application that responds to a signal representing the sum signal and the error signal and the sum signal and the inverted error signal. The inverting of the elevation error signal applied to the modulator 46 is performed by a pulse applied from a multivibrator 246 through a switch 250 to the lead 210. The frequency of the multivibrator 246 may be controlled by a lobing frequency selection switch 252 to vary a selected timing circuit of the multivibrator 246, as is well known in the art. The multivibrator 246 is controlled by a pulse applied thereto from the pulse modulator 150 through a lead 241, a delay multivibrator 243 and a lead 245. The delay multivibrator 243 provides a time delay to allow current change in the presence of inductance of the field of the modulator 46. A lead 247 may be provided to apply the synchronized modulated signal on the lead 241 to, for example, the sweep generators which may be utilized in the terrain avoidance processor 233. Similarly, leads 254 and 255 supply square wave signals which may be used for gating purposes in the terrain avoidance processor 233 as is explained in the above-mentioned copending application. The square wave pulse on the lead 210 is applied through a switch 225, through a 90° phase shifter 220 and through an amplifier 222 to leads 224 and 230. A switch 225 is provided to disconnect the phase shifter 220 whenever desired as, for example during terrain avoidance operation.

In a radar system where the microwave portion may be compactly installed on the movable antenna, the arrangement of FIG. 1 requires two rotary joints 258 and 260 in the waveguides 128 and 146. However, it is to be noted at this time that the circulator is utilized only once on reception so that a minimum of energy loss occurs.

Figure 2:
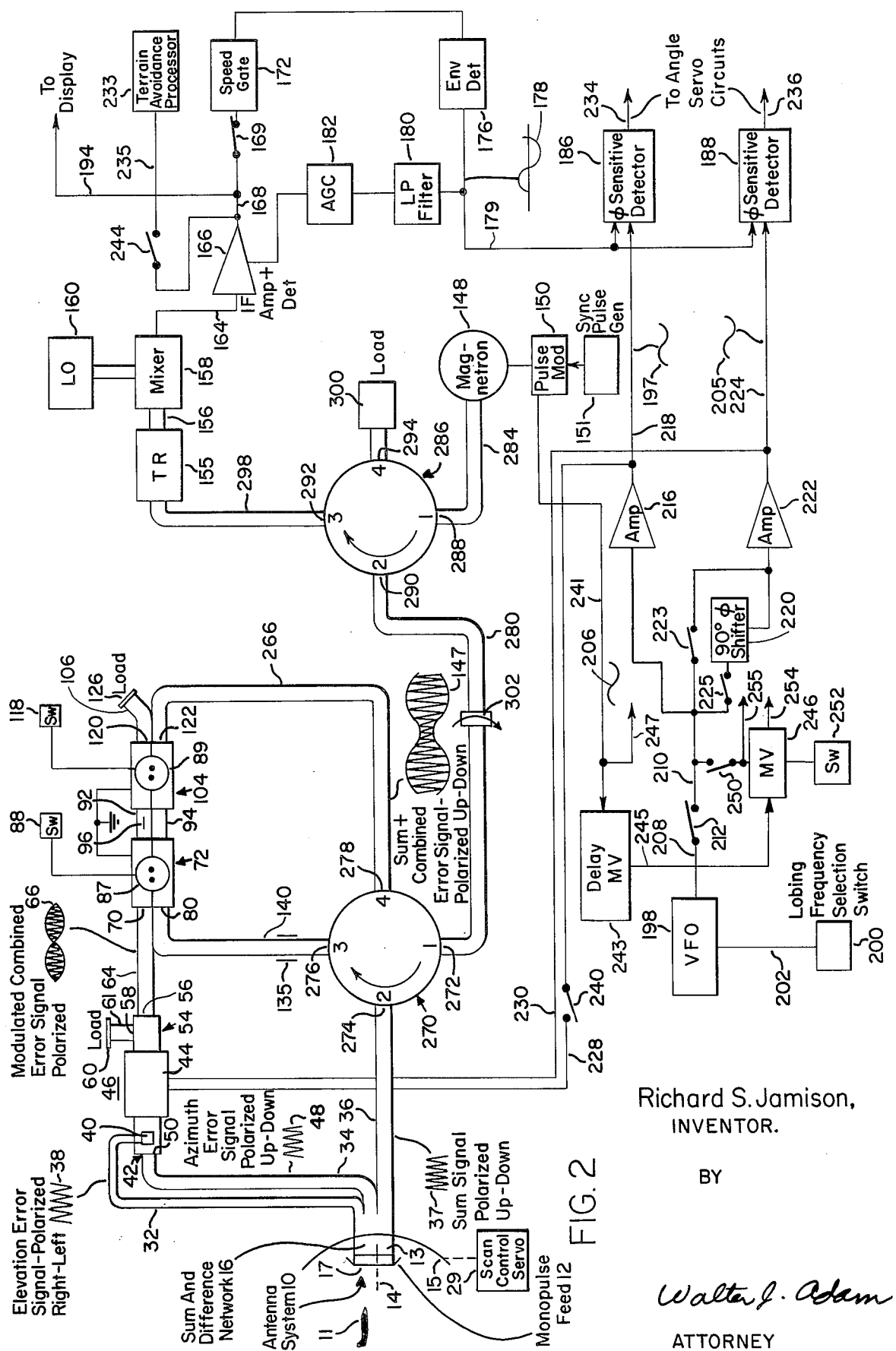
FIG. 2 is a schematic and block diagram of a second radar and terrain avoidance system in accordance with this invention.

Referring now to FIG. 2 an arrangement in accordance with this invention requires only one rotary joint connecting the transmit-receive portion of the system to the modulating portion but with slightly greater energy loss in the circulators during reception than in the system of FIG. 1. The antenna system 10, the modulator 46 and the hybrid junctions 72 and 104 are similar to that of FIG. 1. The terminal 122 of the hybrid junction 104 is connected to a waveguide 266 which in turn connects to a fourth port of a first circulator 270. First, second, third and fourth ports 272, 274, 276 and 278 are provided in the circulator 270 with the second port 274 connected to the waveguide 36, the third port 276 connected to the waveguide 140 and the first port 272 connected to a waveguide 280. An adjustable shim or length adjusting arrangement 135 is included in the waveguide 140 similar to that in FIG. 1. The magnetron 148 in response to the pulse modulator 150 applies pulsed energy through a waveguide 284 to a first port 288 of a second circulator 286. Second, third and fourth ports 290, 292 and 294 are also provided in the circulator 286 with the second port 290 connected to the waveguide 280, the third port 292 connected to a waveguide 298 and the fourth port 294 connected to a load 300. The waveguide 298 applies the common signal of the waveform 147 to the transmit-receive tube 155. The processing arrangement including the mixer 158, the IF amplification and detection, the envelope detector and the source of reference signals including the variable frequency oscillator 198 and the multivibrator 246 are similar to that of FIG. 1 as indicated by the similar reference numerals. A single rotary joint 302 in the waveguide 280 is required to connect the transmit-receive portion of the system with the microwave processing and lobing portion where, as is well known in the art, the microwave processing arrangement is fixedly mounted onto the movable antenna.

Figure 5:
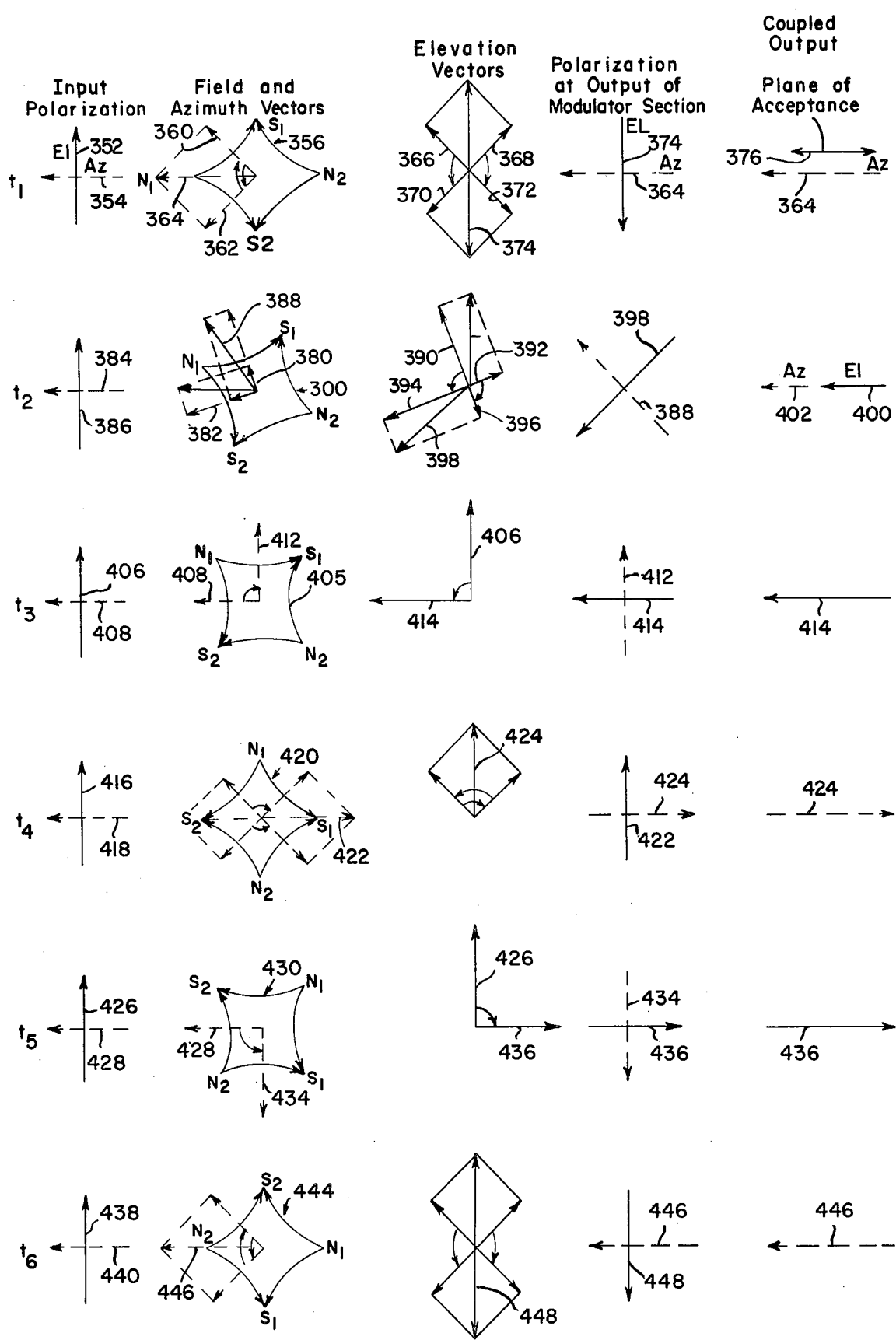
FIG. 5 is a schematic diagram of electrical vectors and the rotating magnetic field for explaining the operation of the ferrite modulator of FIGS. 1 and 2.
Figure 6:
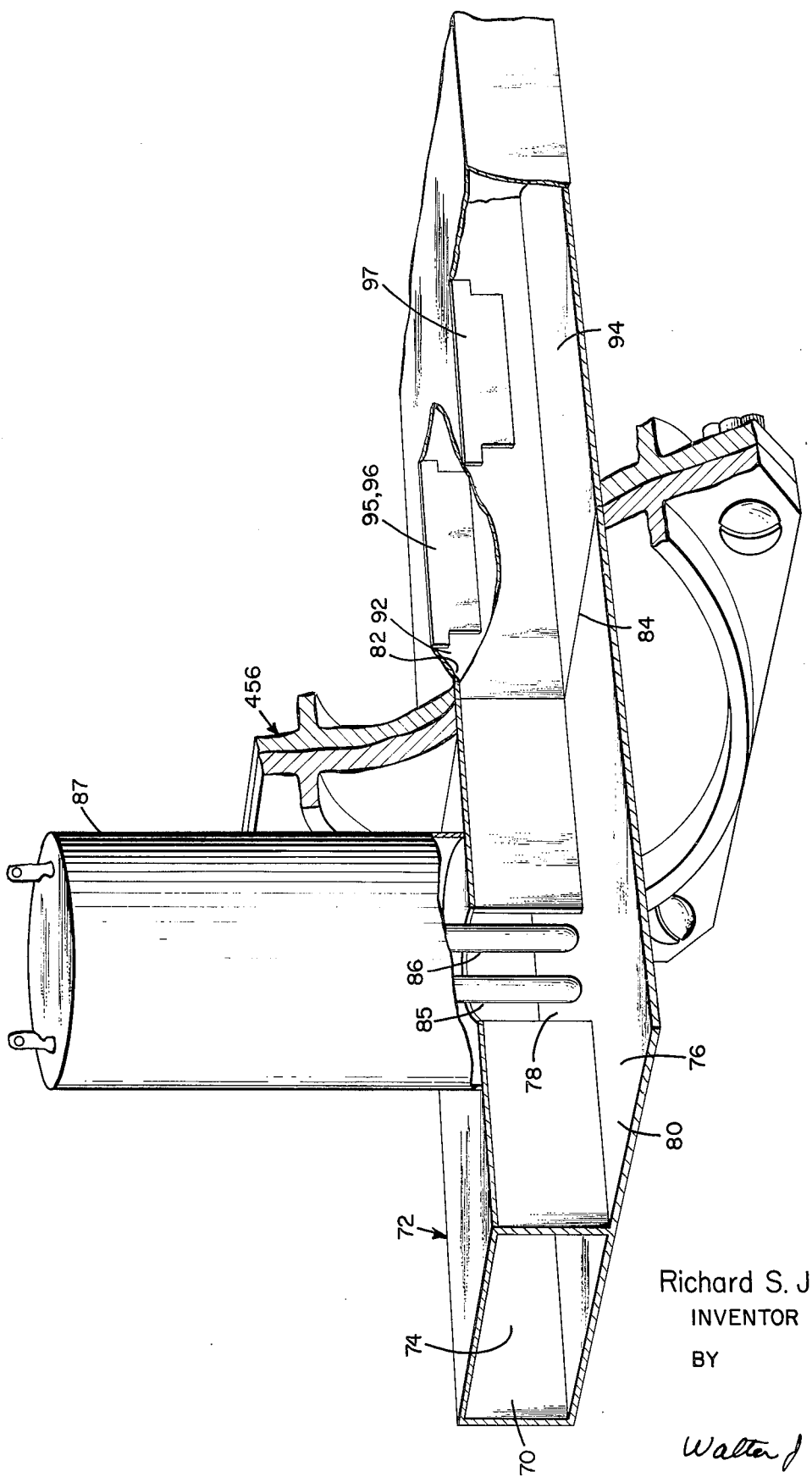
FIG. 6 is a perspective view of the hybrid junction and phase shifter arrangement utilized in the systems of FIGS. 1 and 2.

Referring now to FIG. 5 as well as to FIGS. 1 and 2 the operation of the ferrite modulator 46 will be explained in further detail. The polarized input vectors in space quadrature applied to the modulating section 44 shown by an elevation vector 352 and a dotted azimuth vector 354 at a time $t_1$, are assumed to have equal amplitude for illustrative purposes. This condition is provided by an echo return from an object at an equal angle from the axis 14 (FIGS. 1 and 2) in both azimuth and elevation. The sum and difference network 16, the waveguides 32 and 34 and the coupler 42 determine the polarities of the vectors 352 and 354 for the quadrant of the scan area in which the object is located relative to the axis 14. The magnetic field developed by the modulator 46 is shown at a time $t_1$ by a circular field arrangement 356. It is to be noted at this time that the relative phase and amplitude of the reference signals 197 and 205 for developing the rotating fields shown in FIG. 5 is shown at times $t_1$ to $t_6$ by the waveforms of FIG. 7.

Before further explaining the rotation of the field and vectors the operation of the ferrite in a circularly rotating field will be further explained. The permeability properties of a ferrite in a magnetic field are well known. The normal modes in a ferrite in a transverse magnetic field are a pair of linearly polarized waves. The ferrite modulator in accordance with this invention depends on the birefringent effect of the ferrite in the transverse magnetic field for its operation. A wave incident on the ferrite can be considered as two linearly polarized waves with polarization vectors at right angles to each other and corresponding to two $TE_{11}$ modes. These two waves have different phase velocities so that the polarization of the incident signal may be rotated. By rotating the magnetic field at the modulating frequency and utilizing the coupler 54 at the output which is sensitive to waves of a certain polarization, the signal at the output is an amplitude modulated signal. Because the input signals have their electrical vectors in space quadrature, the modulated signals at the output of the ferrite modulating section are also in space quadrature and are accepted out of time phase by the polarized output of the coupler 54.

The rotation of the vectors of the input signals and their relative phase velocities may be determined at any instant of time by applying a suitable phase shift convention to the field representation such as 356. The rotational position of the field such as 356 is determined by the phase and amplitude relations of the reference signals of the waveforms 197 and 205. At time $t_1$, the incident azimuth electrical vector 354 may be represented by vectors 360 and 362 parallel to the linear axis of the field and unaffected by the field forces at right angles thereto. To determine the effect of the ferrite on these vectors at any instant of time, each vector is rotated +90° when the field arrow on the vector's right is up or in the same direction as the vector and the field arrow on the vector's left is down or in the opposite direction from that of the vector. Also each vector is rotated −90° when the field arrow on the vector's right is down or in the opposite direction from that of the vector and the field arrow on the vector's left is up or in the same direction as the vector. Thus at time $t_1$, the vector component 360 is rotated +90° (counterclockwise) to the position of the vector 362 and the vector 362 is rotated −90° (clockwise) to the position of the vector 360. Therefore at the rotational angle position of the field 356 at time $t_1$ the azimuth vector 354 is not rotated as shown by the resultant azimuth vector 364.

The elevation vector 352 may be represented by vector components 366 and 368 at right angles to each other and parallel to the fields of force. The vector component 366 is rotated +90° as shown by the vector component 370 and the vector component 368 is rotated −90° as shown by the vector component 372. The resultant position of the elevation vector provided by the field 356 is shown by a vector 374 which has been rotated 180° from the incident vector 352. At time $t_1$ all of the azimuth vector 364 is accepted by the coupler 54 having a plane of acceptance 376 and applied to the waveguide 64. At this time, none of the elevation vector 374 is applied to the waveguide 64 but all of the energy of the elevation vector 374 is applied to the waveguide section 61 and absorbed by the load 60. This same convention may be utilized to determine the resultant vectors at any instant of time or rotational position of the field.

At time $t_2$, the magnetic field has rotated approximately 22.5 degrees as shown by a field 300 in response to the signals of the waveforms 197 and 205. The azimuth vector components that are parallel to the magnetic fields are shown by dotted vector components 380 and 382 of the input vector 384. Following the above convention, the vector component 380 is rotated +90° to the angular position of the vector component 382 and the vector component 382 is rotated −90° to the angular position of the vector 380. The result is a vector 388 having the same amplitude as the input vector 384. The elevation input vector 386 is also broken down into vector components 390 and 392 parallel to the fields of force. The vector component 392 is rotated −90° as shown by a vector component 396 and the vector 390 is rotated +90° as shown by the vector component 394. The resultant of the rotation of the elevation vector 386 at time $t_2$ is shown by a vector 398. The coupler 54 responds to the vectors 388 and 398 to apply elevation and azimuth vectors 400 and 402 to the waveguide 64 polarized in the plane of acceptance 376.

At time $t_3$ the magnetic field has rotated to the position shown by a field 405 so as to be parallel to input elevation and azimuth vectors 406 and 408. The vector 408 is rotated −90° and the vector 406 is rotated +90° to form the respective vectors 412 and 414. Thus in the position of the field 405, components of the input vectors are not involved. The elevation and azimuth vectors 414 and 412 are applied to the coupler 54 with all of the energy of the elevation vector 414 being applied to the waveguide 64.

At time $t_4$, elevation and azimuth input vectors 416 and 418 are applied to a rotated field 420 to form the resultant azimuth and elevation vectors 422 and 424 by rotating the vector components in accordance with the above discussion. All of the energy represented by the azimuth vector 424 is applied to the waveguide 64 and all of the elevation energy represented by the elevation vector 422 is absorbed in the load 60.

At time $t_5$, elevation and azimuth vectors 426 and 428 are again parallel to the lines of force of a field 430 and resultant vectors 434 and 436 are formed by the ferrite as a result of a respective +90° and −90° rotation of the vectors 428 and 426. The rotated elevation vector 436 passes through the plane of acceptance 376. At time $t_6$, the elevation and azimuth vectors 438 and 440 in space quadrature are applied to a field 444 to form resultant azimuth and elevation vectors 446 and 448 in space quadrature. The azimuth vector 446 is passed through the plane of acceptance 376 of the coupler 54.

Thus, the components of the input vectors are rotated at different angular velocities as the field rotates to provide resultant vectors that rotate at twice the angular velocity of the field. This rotation is continuous for both input vectors arranged in space quadrature and the plane of sensitivity of the output coupler 54 applies elevation and error signals therethrough amplitude modulated 90° out of time phase from each other, which phase difference is utilized to detect the individual error signals in subsequent portions of the receiver system. As may be seen in FIG. 7, the modulated elevation error signal of waveform 450 is formed from the coupled output vectors 400, 414 and 436 at respective times $t_{2}$, $t_{65}$ and $t$ with no azimuth error signal vector being coupled out at times $t$ and $t$. The modulated azimuth error signal of a waveform 452 is formed from the coupled output vectors 364, 402, 424 and 446 at respective times $t$, $t$, $t$ and $t$ with no elevation vectors being coupled out at times $t_1$, $t_4$ and $t_6$. The modulation of the error signals of the waveforms 450 and 452 are in phase with the respective reference signals of the waveforms 205 and 197. As shown by the waveform 66 of FIG. 11 the envelope of the combined error signal in the waveguide 64 has a phase and amplitude determined by the resultant of both of the elevation and azimuth vectors in the plane of acceptance.

In the terrain avoidance mode of operation, for example only the elevation vector is utilized and this vector is continuously inverted in response to a square wave reference signal. It is to be noted that at times $t_3$ and $t_5$ the elevation signal is inverted and no azimuth vector is coupled through the plane of acceptance 376 as the magnetic field is alternately rotated 90° (in response to a change in polarity of the square wave pulse). Also at times $t_3$ and $t_5$ the reference signal of the waveform 197 (FIG. 7) is zero. Thus by applying a square wave to the same lead 230 of the modulator 46 having positive and negative amplitudes the same as that of the waveform 205 at times $t_3$ and $t_5$, the elevation vector may be alternately inverted for the terrain avoidance mode, as is fully described in my above mentioned copending application.

Figure 8:
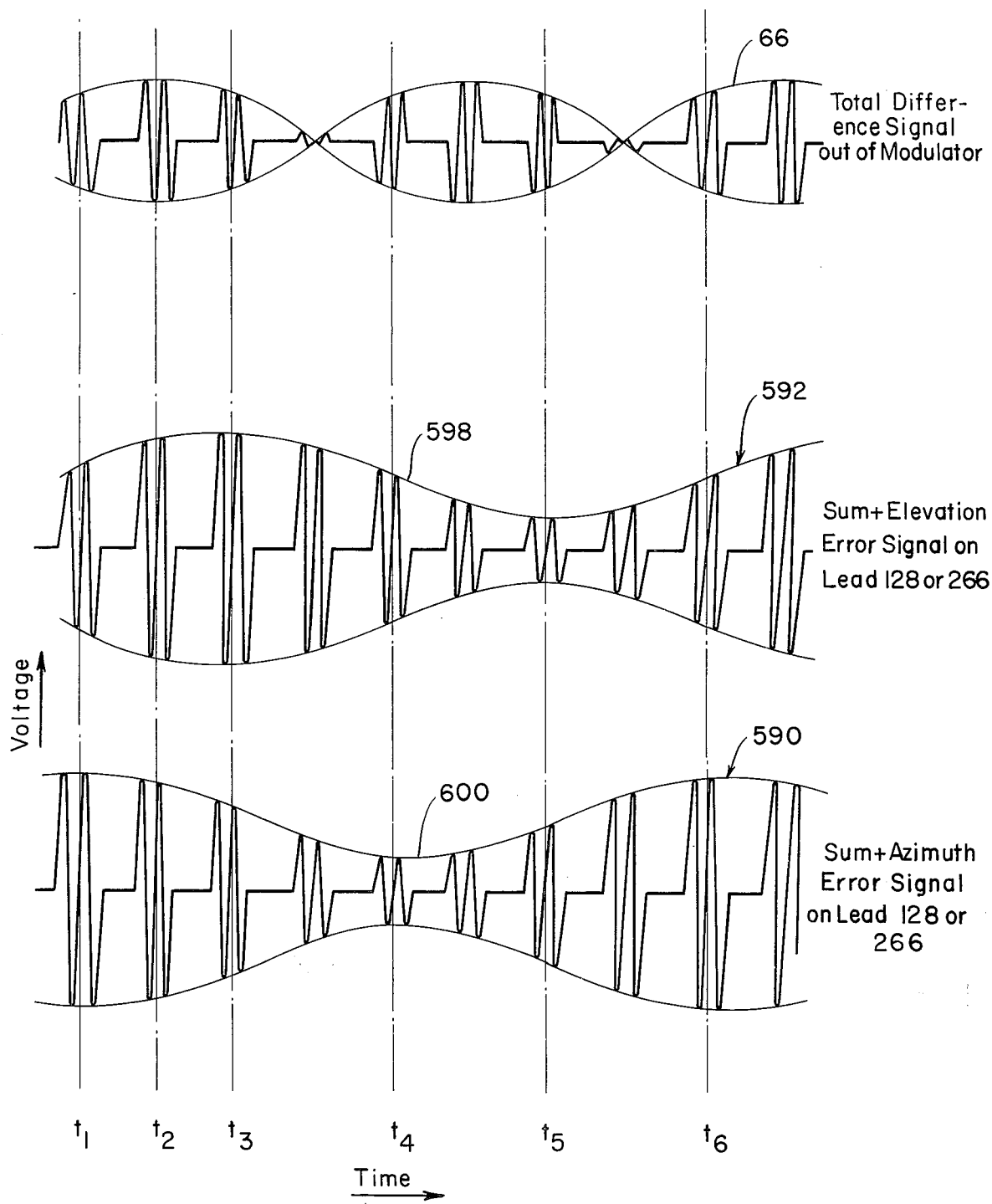
FIG. 8 is a schematic diagram of additional waveforms for explaining the operation of the systems of FIGS. 1 and 2.

Referring now to the perspective view of FIG. 8 of a hybrid junction in accordance with this invention as well as to FIGS. 3 and 4, the structure of the system elements will be explained in further detail. The respective waveguide sections 74 and 76 of the hybrid junction 72 are connected to the waveguides 64 and 140 by a suitable connecting arrangement. A pair of flanges 456 may be provided for connecting the waveguides 92 and 94 to the respective waveguide sections 74 and 76. The aperture 78 includes the probes or posts 85 and 86 shown inserted substantially the depth of the aperture to close the aperture 78 to the transfer of energy. The solenoid 87 is provided to move the posts 85 and 86 to the position shown in the apertures or to withdraw the probes so that the conventional hybrid junction transfer of energy is provided. The dielectric sheet 96 to provide a desired phase shift in the waveguide 92 is attached to the top wall of the waveguide 92 and may have a stepped leading and trailing edge as is well known in the art. The dielectric sheet 96 may be placed in any predetermined convenient position along the horizontal width of the waveguide 92. The sheet 96 may be a structural material such as fiberglass. When the resistive plate or sheet 95 is utilized in accordance with this invention, the configuration may be the same as the sheet 96 except the fiberglass may be coated with any conventional resistive or lossy material such as michrome. A sheet or plate 97 is shown in the waveguide 94 having the same configuration as the sheets 95 and 96. The sheet 97 is not coated with a resistive material but is only provided to cancel any phase shift caused by the resistive sheet 95. In accordance with the principles of this invention, the phase shift correction sheet 97 may not be required for satisfactory operation. The construction of the hybrid junction 104 of FIGs. 3 and 4 is similar to the hybrid junction 72 and will not be explained in further detail.

Referring now to FIG. 3 the operation of the hybrid junctions to provide summing of desired portions of the sum signal and the combined error signal will be explained in futher detail. The combined differences voltage or error signal voltage (of the waveform 66 of FIGS. 1 and 2) is represented as $D_E$ and the sum signal voltage is represented by $S_E \angle -90°$ in the respective waveguides 64 and 140. The $-90°$ phase shift of the sum signal is provided by the adjustable shims 135 of FIGS. 1 and 2. The sum voltage transferred straight through the waveguide section 76 indicated by an arrow 498 is $$\frac{S_E}{\sqrt{2}} \angle -90°$$

As a result of the substantially equal energy division at the aperture 78, the sum voltage signal transferred through the aperture 78 with a conventional $-90°$ phase shift indicated by an arrow 500 is $$\frac{S_E}{\sqrt{2}} \angle -180°.$$

The angular designation of the voltage values in FIGS. 3 and 4 is the conventional polar coordinate angular representation. The difference voltage passed through the waveguide section 74 indicated by an arrow 504 is $$\frac{D_E}{\sqrt{2}} \angle 0°$$

and the difference voltage transferred through the aperture 78 with a phase shift and indicated by an arrow 506 is $$\frac{D_E}{\sqrt{2}} \angle -90°.$$

The energy in the waveguide 92 is then applied past the dielectric phase shift plate or sheet 96 to the terminal 100 of the hybrid junction 104. The voltage signals at the terminal 100 are $$\frac{D_E}{\sqrt{2}} \angle -X°$$

and $$\frac{S_E}{\sqrt{2}} \angle -180° - X°$$

where X represents the desired phase shift in degrees of the sheet or plate 96. The factor X may have a value of 37° for providing a desired 10 db (decibel) attenuation at the output of the hybrid junction 104 as will be explained subsequently. The voltage signals at the input terminal 102 of the hybrid junction 104 are $$\frac{S_E}{\sqrt{2}} \angle -90°$$

and $$\frac{D_E}{\sqrt{2}} \angle -90°$$

which are the signals applied to the waveguide 128 during the normal track mode of operation when the posts 112 and 114 are inserted in the aperture 110 so that substantially no energy division is provided in the hybrid junction 104. During normal tracking the energy at the terminal 100 is absorbed in the load 126 and the energy at the terminal 102 is applied to the waveguides 128 or 266 as the common signal of the waveform 147 of FIGs. 1 and 2. Because the voltage $S_E$ and $D_E$ are divided by $\sqrt{2}$, half of the sum energy and half of the difference or error energy is applied to the waveguide 128 or 266. Also it is to be noted that because of the adjustment of the length of the waveguide 140, the difference voltage and the sum voltage are in phase in the waveguides 128 or 266.

During anti-jam operation the sum signal is attenuated by 10 db and the error or difference signal is attenuated by 0.5 decibel. In this anti-jam mode, the apertures 78 and 110 of the respective hybrid junctions 72 and 104 are open in response to the respective switches 88 and 118 of FIGs. 1 and 2. The sum voltage at the terminal 102 transferred directly through the waveguide section 108 indicated by an arrow 510 is $$\frac{S_E}{2} \angle{-90°}$$

and transferred through the aperture 110 indicated by an arrow 512 is $$\frac{S_E}{2} \angle{-180°}$$

after being phase shifter 90 degrees. The difference or error signal voltage at the terminal 102 transferred straight through the waveguide section 108 indicated by an arrow 516 is $$\frac{D_E}{2} \angle{-90°}$$

and transferred through the aperture 110 with a phase shift and indicated by an arrow 518 is $$\frac{D_E}{2} \angle{-180°}.$$

The sum voltage at the terminal 100 applied straight through the waveguide section 106 indicated by an arrow 522 is $$\frac{S_E}{2} \angle{-180° - X°}$$

and the sum voltage transferred through the aperture 110 indicated by an arrow 524 is $$\frac{S_E}{2} \angle{-270° - X°}.$$

The difference voltage at the terminal 100 applied straight through the waveguide section 106 indicated by an arrow 528 is $$\frac{D_E}{2} \angle{-X°}$$

and transferred through the aperture 110 indicated by an arrow 530 is $$\frac{D_E}{2} \angle{-90° - X°}.$$

Thus the sum signal applied to the waveguide 128 or 266 is $$\frac{S_E}{2} \angle{-90°}$$

and $$\frac{S_E}{2} \angle{-270° - X°}$$

and would cancel except for the factor X which is selected to provide 10 db attenuation of the sum signal. The remainder of the sum signal is dissipated in the load 126. The difference voltage applied to the waveguide 128 or 266 is $$\frac{D_E}{2} \angle{-90°}$$

and $$\frac{D_E}{2} \angle{-90° - X°}$$

which would be the total difference signal except for the phase shift factor X. Thus the sum signal applied to the waveguide 266 or 128 is attenuated 10 decibel so that the majority of the common signal of the waveform 147 is error signal. Substantially 0.9 of the sum energy and 0.1 of the error signal energy are dissipated in the load 126.

During search operation when only the sum signal is utilized, the apertures 78 and 110 of the hybrid junctions 72 and 104 are both closed so that all of the sum energy is applied to the waveguides 128 or 266 and all of the difference or error energy is dissipated in the load 126.

Referring now to FIG. 4, the operation of the hybrid junctions when the resistive card or attenuating plate 95 is provided in the waveguide 92 will be further explained. Similar to the discussion relative to FIG. 3, the voltage signals at the terminal 82 are $$\frac{S_E}{\sqrt{2}} \angle{-180°}$$

and $$\frac{D_E}{\sqrt{2}} \angle{0°}$$

indicated by respective arrows 534 and 536. The voltage signals at the terminal 84 are $$\frac{S_E}{\sqrt{2}} \angle{-90°}$$

and $$\frac{D_E}{\sqrt{2}} \angle{-90°}$$

indicated by respective arrows 540 and 542. After being applied past the resistive plate 95, the voltage signals at the terminal 100 are $$\frac{S_E}{A\sqrt{2}} \angle{-180°}$$

-continued and $$\frac{D_E}{A\sqrt{2}} \angle 0°$$

with A being the attenuation factor of the resistive plate 95. It is to be noted that any phase shift caused by the attenuation plate 95 may be cancelled by the non resistive plate 97 so that for convenience of explanation, this phase shift will not be considered. The voltage signals at the terminal 102 are thus the same as at the terminal 84. During track operation the aperture 110 of the hybrid junction 104 is closed so that the signals at the terminal 102 are applied to the waveguides 128 or 266 and the signals at the terminal 100 are dissipated at the load 126. It is to be noted that during this tracking operation, half of the sum and difference or error energy is absorbed in the load 126 and half of the sum and difference or error energy is applied to the waveguides 128 or 266 as the waveform 147 of FIGS. 1 and 2.

During the anti-jam mode of operation, the hybrid junctions 72 and 104 are both open so the difference signal at the terminal 100 applied directly through the wavegude section 106 and indicated by an arrow 544 is $$\frac{D_E}{2A} \angle 0°$$

and applied through the aperture 110 indicated by an arrow 546 is $$\frac{D_E}{2A} \angle -90°$$

The sum signal at the terminal 100 applied directly through the waveguide section 106 indicated by an arrow 550 is $$\frac{S_E}{2A} \angle -180°$$

and transferred through the aperture 110 indicated by an arrow 522 is $$\frac{S_E}{2A} \angle -270°$$

The difference or error signal at the terminal 102 applied directly through the waveguide section 108 indicated by an arrow 556 is $$\frac{D_E}{2} \angle -90°$$

and transferred through the aperture 110 indicated by an arrow 560 is $$\frac{D_E}{2} \angle -180°.$$

The sum signal voltage at the terminal 102 applied directly through the waveguide section 108 indicated by an arrow 564 is $$\frac{S_E}{2} \angle -90°$$

and transferred through the aperture 110 indicated by an arrow 566 is $$\frac{S_E}{2} \angle -180°.$$

Thus the difference voltage signals applied to the waveguides 128 or 266 are in phase and of equal amplitude except for the attenuation factor A. The sum signals at the waveguide 128 or 266 are 180 degrees out of phase and would cancel except for the attenuation factor A. For example, if the attenuation factor A is one, the sum voltage cancels at the waveguides 128 or 266 and if A is infinity, half of the sum signal voltage or one quarter of the sum energy or power (6 db attenuation) is applied to the waveguides 128 or 266. As the sum signal is desired to be decoupled by 10 db, an attenuation plate 95 of approximately 6 db is required which has an attenuation factor A of approximately 2.0. The difference or error signal is attenuated by 2.5 db when A is approximately 2.0. Thus in the anti-jam mode, approximately 0.56 of the error energy (0.75 of the voltage) and 0.063 of the sum energy (0.25 of the voltage) are applied to the waveguides 128 or 266 as the common signal of the waveform 147 (FIGS. 1 and 2). It is to be noted that any desired attenuation factor may be utilized in accordance with the principles of this invention. It is also to be noted that this example of the attenuation factor A provides the same sum to error signal voltage ratio as the previous example with the phase shift plate. The factors of these two examples are selected with the same target error angle.

During search operation as discussed previously the hybrid junctions 72 and 104 are both closed so that all of the sum energy is applied to the waveguides 128 or 266 and all of the difference or error signal energy is dissipated in the load 126.

Referring now to FIGS. 1 and to the waveforms of FIGS. 7 and 8, the operation of the system in accordance with this invention will be explained in further detail. Although the system will be explained when operating as a pulsed radar system, it is to be again noted that the system in accordance with this invention is also equally applicable to continuous wave operation. The magnetron 148 in response to control pulses of the pulse modulator 150 applies pulsed bursts of radio frequency energy to the waveguide 146, the energy appearing similar to a waveform 576 except of larger amplitude. The pulsed energy passes into the first port 130 and out of the second port 132 of the circulator 129 into the waveguide 36. The energy similar to the waveform 576 then passes through the sum and difference network 16 substantially without loss, is radiated equally from the four apertures 13 and is reflected from the disc 15 into space.

The transmitted signal is then reflected from an object in space such as the craft 11 which may be above or below an azimuth through the axis 14, to the right or left of an elevation plane through the axis 14 or coincident with the axis 14. The echo signal is then intercepted by the dish 15 and received by the four monopulse apertures 13 to be applied to the sum and difference network 16 as shown by the waveform 576 in FIG.

7. In response to the arrangement of the magic tee couplers, as discussed previously, the elevation difference or error signal of the waveform 38 is applied to the waveguide 32 and to the coupler 42 polarized in the right-left direction. The azimuth difference or error signal of the waveform 48 is applied to the waveguide 34 polarized up-down and applied to the coupler 42. The elevation and azimuth error signals are then applied to the modulating section 44 of the modulator 46 coupled in space quadrature to be modulated or lobed at a selected frequency.

The variable frequency oscillator 198 applies a signal of the waveform 206 to the lead 210 at a frequency determined by the lobing frequency selection switch 200. The reference signals of the waveforms 197 and 205 are respectively applied to the leads 228 and 230 with the signal 205 delayed in phase 90°. Thus as discussed relative to FIG. 5 the applied signals are rotated by the ferrite modulator section 44 and passed through the plane of acceptance of the waveguide section 56 of the coupler 54 to the waveguide 64. The modulated azimuth error signal of the waveform 452 as seen in FIG. 7 is in phase with the reference signal of the waveform 197 and represents only the azimuth error portion of the combined signal of the waveform 66 in the waveguide 64. The elevation signal of the waveform 450 is in phase with the reference signal of the waveform 205 and represents only the elevation portion of the total error signal of the waveform 66.

The amplitude of the azimuth error signal of the waveform 452 represents the angular deviation of the path of the return energy to the right or left of a vertical plane coincident with the antenna axis 14. The polarity sequence of the electrical vectors such as 580, 582 and 584 is determined by the position of the object in space being to the right or left of the above discussed horizontal plane. It is to be noted that the electrical vectors such as 580 and 582 are shifted 180° in phase as is the reference signal at each half cycle of the modulation. Also, it is to be noted at this time that the error signals of the waveforms 450 and 452 are double sideband suppressed carrier signals.

The amplitude of the elevation error signal of the waveform 450 represents the angular deviation of the path of the return energy above or below a horizontal plane coincident with the antenna axis 14. The polarity sequence of electrical vectors such as 586 and 588 determine whether the object 11 is above or below this horizontal plane. When the object in space such as 11 is aligned with the antenna axis 14 no error signals are present and when the object is coincident with the horizontal or vertical plane through the axis 14 the elevation or the azimuth error signals respectively have zero amplitude. The total combined error signal of the waveform 66 has an envelope phase and an amplitude determined by the combined error signals of the waveforms 450 and 452. Thus the error signals are modulated on reception with the envelope phase relation being utilized for separation of the components during processing. The frequency of the modulation is variable either to selected specific values or continuously so that an enemy jamming source is unable to determine a frequency to provide effective jamming or changing of amplitude or phase of the error signals.

The combined error signal of the waveform 66 is applied to the hybrid junction 72. The received sum signal of the waveform 37 is simultaneously applied to the waveguide 36, to the second port 132 and into the third port 134 of the circulator 129, to the waveguide 140 and into the hybrid junction 72.

Referring now also to FIGS. 3 and 4, the energy of the combined error signal of the waveform 66 and the sum signal of the waveform 37 are combined during track operation to form the combined or common signal of the waveform 147. As discussed above, the hybrid junction 104 is closed during track operation and half of the energies of the error signal of the waveform 66 and of the sum signal of the waveform 37 are summed and applied to the waveguide 128.

The combined portion of the azimuth error signal of the waveform 452 and a portion of the sum signal of the waveform 37 provides a combined signal of a waveform 590 in the waveguide 128 after summing by the hybrid junction 72. A waveform 592 represents the summed portion of the elevation error signal of the waveform 450 and of the sum signal of the waveform 37 in the waveguide 128. It is to be noted that the summed signals of the waveforms 592 and 590 respectively represent the condition when the error signal is all azimuth signal or all elevation signal and are shown for clarity of the description. As shown by the waveform 590, the azimuth error signal of the waveform 452 adds to the sum signal of the waveform 37 which has electrical vectors such as 594, between times $t_1$ and $t_3$ and times $t_5$ and $t_6$, and subtracts from the sum signal between times $t_3$ and $t_5$. Similarly, the elevation error signal of the waveform 592 adds to the sum signal of the waveform 37 between times $t_1$ and $t_4$ and subtracts from the sum signal between times $t_4$ and $t_6$. The combined signals of the waveforms 592 and 590 have respective amplitude modulated envelopes 598 and 600. It is to be noted that for anti-jam operation when the hybrids 72 and 104 are both open in response to the switches 88 and 118 (FIG. 1), the summing operation provides a large amplitude error signal and a small amplitude sum signal. For example, the error signal and sum signal may be respectively 0.9 and 0.1 of the input energy in the respective waveguides 64 and 140. It is to be noted that during search operation both hybrid junctions 72 and 104 are closed in response to the switches 88 and 118 and only the total unmodulated sum signal of the waveform 37 is applied to the waveguide 128. This sum signal after mixing and detecting is applied from the lead 168 to the lead 194 to control the display for example. During search operation, the switch 169 may be open.

The combined signal of the waveform 147 is applied from the waveguide 128 to the transmit-receive tube 155 which allows the lower amplitude received energy to pass therethrough to the waveguide 156 but prevents any high energy leakage energy from passing during transmission. The combined signal of the waveform 147 is then applied to the mixer 158 where, in response to the local oscillator 160, the signal is heterodyned to an intermediate frequency signal. The IF common signal similar to the waveform 147 except at intermediate frequency is then applied to the IF amplifier 166 to be amplified and converted to a video frequency in the common amplifier.

The amplified signal from the IF amplifier 166 which is also detected by conventional circuits therein is passed to a range gate 172 which, as is well known in the art, may be a servo controlled frequency tracking loop that tracks the pulsed signals in time or range. The detected IF signal derived from the range gate 172 is then passed to a conventional envelope detector 176 which acts to shift the carrier wave to a DC (direct current) signal for providing a reference signal of the waveform 178 while retaining the sideband information at the amplitude modulation frequency of the common signal similar to the waveform 147. The DC signal derived from the envelope detector 176 is then passed through the low pass filter 180 which essentially passes only the DC signal to the automatic gain control circuit 182. The automatic gain control circuit 182 varies the amplification of the IF amplifier 166 so as to normalize the amplification in response to the peak amplitude of the sum signal. The detected sideband error signals of the waveform 178 are then applied from the lead 179 to the phase sensitive detectors 186 and 188. The reference signal of the waveform 178 includes the modulation information of the envelopes 598 and 600 respectively representing the elevation and azimuth error information.

The reference signals of the waveforms 197 and 205 are respectively applied to the phase sensitive detectors 186 and 188 to separate the in phase elevation and azimuth error components from the combined signal of the waveform 178 and develop DC output signals (not shown) on the leads 234 and 236. The DC output signals on the leads 234 and 236 have voltage levels indicative of the relative peak amplitudes of the modulated elevation and azimuth error signal components of the envelope detected error signal of the waveform 178. The DC error signals on the leads 234 and 236 are then applied to angle servo circuits which may control the direction of the antenna system 10 or may control the guidance of a craft, for example.

Figure 7:
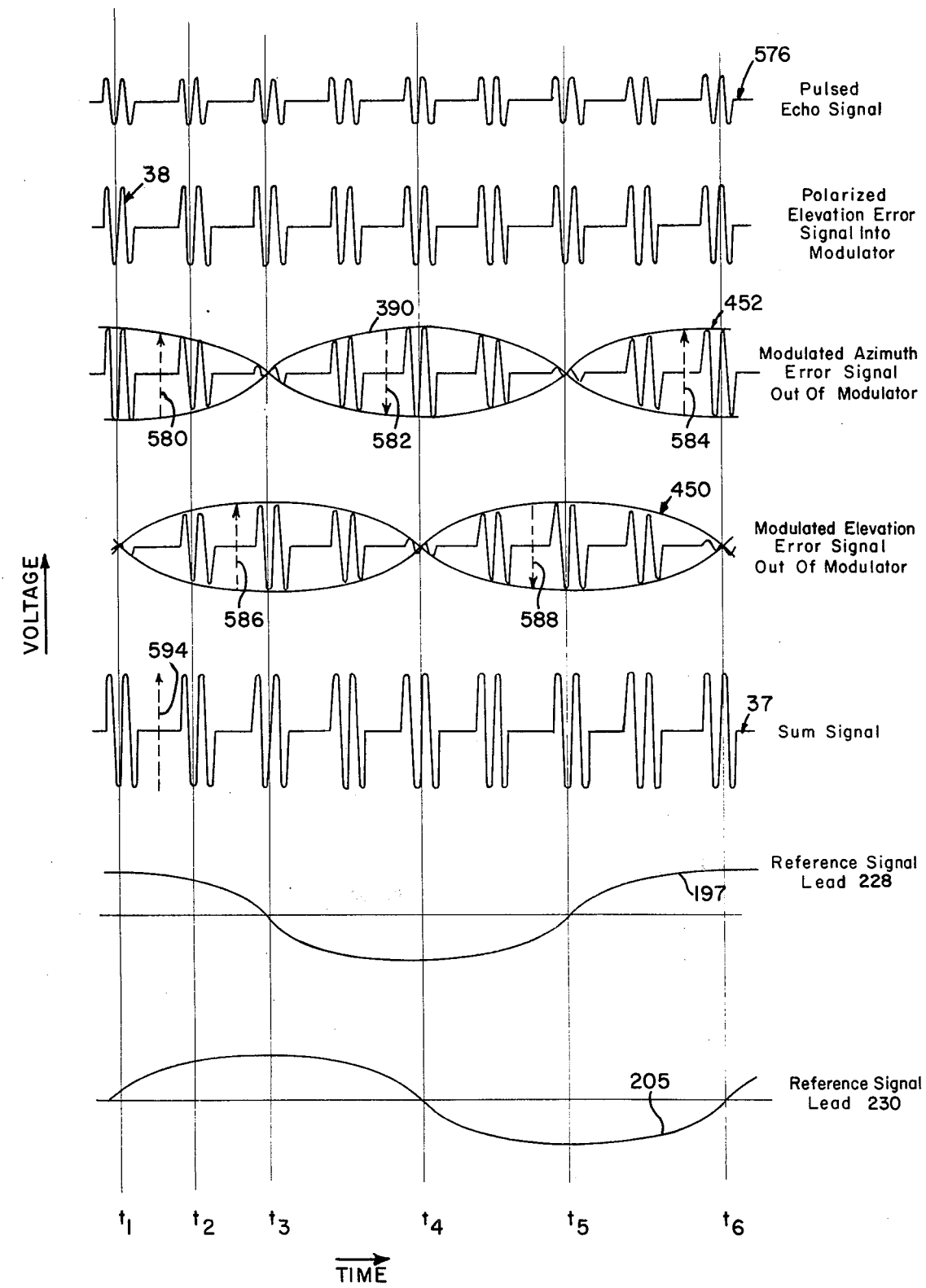
FIG. 7 is a schematic diagram of waveforms for explaining the operation of the systems of FIGS. 1 and 2.

Referring now to FIG. 2, as well as to FIGS. 7 and 11, the operation during reception to form the combined error signal of the waveform 66 and the sum signal of the waveform 37 is similar to that of the arrangement of FIG. 1. The sum signal of the waveform 37 is applied from the waveguide 36 to the second port 274 of the circulator 270 and out of the third port 276 to the waveguide 140 where the adjustable shim 135 provides a $-90$ degrees phase shift. As discussed relative to FIGS. 3 and 4 the common signal of the waveform 147 is applied to the waveguide 266 when utilizing either the dielectric plate 96 or the resistive plate 95. The summed signal of the waveform 147 is applied from the waveguide 266 to the fourth port 278 of the circulator 270 and out of the first port 272 to the waveguide 280. The signal of the waveform 147 is then applied through a circulator 286 via ports 290 and 292 to a waveguide 298, through; the transmit-receive tube 155 to the mixer 158 and processed similar to the discussion relative to FIG. 1, in response to the variable frequency oscillator 198. During track operation and anti-jam operation the system operates in a similar manner except with different percentages of the sum signal and the error signal. Also during search operation the system operates with all sum signal energy and no error signal energy similar to the arrangement of FIG. 1. It is to be noted that the combined signal of the waveform 147 is passed through the circulator 270, in the arrangement of FIG. 2. However, only a single rotary joint 302 is required between the modulating and transmit-receive portions of the system.

During transmission, the pulsed bursts of energy similar to the waveform 576 are applied from the magnetron 148 in response to the pulse modulator 150 to the first port 288 of the circulator 286 and out of the second port 290 to the waveguide 280. The signal similar to the waveform 576 except with the pulses at an earlier time period are then applied through the first port 272 and second port 274 to the waveguide 36 and transmitted through the sum and difference network 16 into space. After reflection from an object such the craft 11, the energy is intercepted by the antenna system 10 as the signal of the waveform 576.

Figure 9:
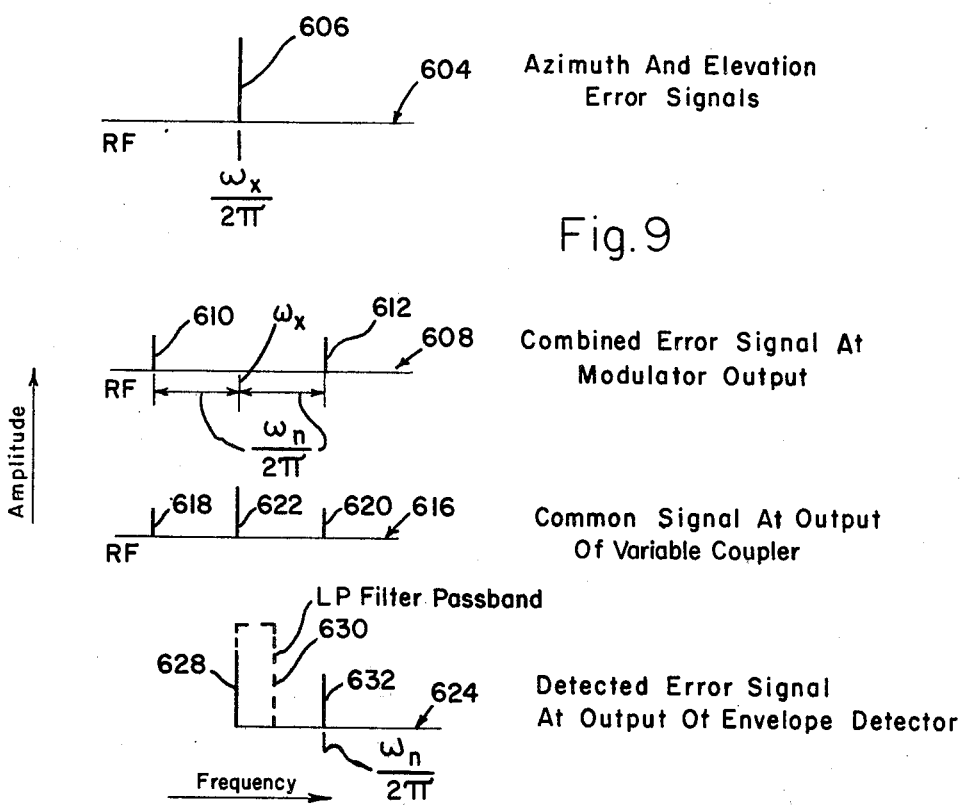
FIG. 9 is a spectral diagram of amplitude versus frequency for further explaining the operation of the modulator and the signal processing systems of FIGS. 1 and 2.

Referring now to the spectral diagram of FIG. 9 which is a diagram showing frequency versus amplitude of signals in various portions of the system in accordance with this invention, the overall operation will be explained in further detail. The error signals derived at radio frequency from the sum and difference network 16 as well as the sum signal are represented by a diagram 604 which shows a signal 606 at a frequency $\omega_x/2\pi$, where $\omega_x$ is the radio or microwave frequency of the transmitted and received energy. The double sideband suppressed carrier combined error signal at the output of the modulator 46 is shown by a diagram 608 having double sideband signals 610 and 612 each including the modulated error signal of the waveforms 450 and 452 of FIG. 7. The sideband signals 610 and 612 are each separated from the carrier frequency $\omega_x$ by a frequency difference of $\omega_n/2\pi$ where $\omega_n$ is the selected radian frequency of the reference signals of the waveforms 197 and 205 and of the lobing frequency. Thus the frequency separation of the modulated sidebands varies with the angular frequency of the rotating field of the modulator 46. An interfering signal received by the antenna system 10 must be received substantially at a frequency difference of $\omega_n/2\pi$ from the carrier frequency in order to interfere with the amplitude of the error signals and thus interfere with the directional information. Therefore in order to overcome interfering jamming signals, the angular velocity of the field is varied by varying the frequency of the variable frequency oscillator 198. The spectral positions of the sideband signals 610 and 612 may vary in a continuous pattern or may vary randomly as determined by the selection switch 200. Because the phase sensitive detectors 186 and 188 only respond to signals at the frequency of the reference signals of the waveforms 197 and 205, which is the frequency $\omega_n$, undesired jamming signals not having a similar frequency to the sideband signals 610 and 612 have substantially no effect on the detected error signal. In the arrangements in accordance with this invention, the lobing frequency is not transmitted which denies this information to an enemy. Thus the enemy jammer is forced to sweep through all lobing frequencies with a minimum chance of providing interference.

Therefore the ferrite modulator 46 develops a double sideband suppressed carrier signal of the diagram 608 which is summed with carrier or sum signal by the operation of the hybrid junction 72 or of the hybrid junctions 72 and 104 to form the signal of a diagram 616. The relative amplitudes of the sum signal 622 and error signals 618 and 620 of the diagram 616 are determined by the opening and closing of the hybrid junction 104 by the switch 118 when the hybrid junction 72 is open in response to the switch 88. The relative amplitudes of the error and sum signals is also determined by target positions as well as by selection of the phase shift of the dielectric plate 96 or the attenuation factor of the resistive plate 95. The detected signal at the output of the envelope detector 176 is shown by a diagram 624 with the sum signal frequency shifted to a DC signal which is applied to the AGC circuit 182. The combined detected error signal 632 at a frequency $\omega_n/2\pi$ is applied to the phase sensitive detectors 186 and 188.

Referring now principally to FIGS. 1 and 2, the system operation will be further clarified by some mathematical representations. The elevation and azimuth energy that appears at the output of the modulator 46 is of the form (sin$\omega$ $$E_o = N (\sin\omega_x t \sin \omega_n t) + \epsilon (\sin\omega_x t \cos\omega_n t) \qquad (1)$$

where $N =$ the initial elevation error signal amplitude and
$\epsilon =$ the initial azimuth error signal amplitude.

Thus as can be seen from an expansion of equation (1) the output of the modulator of the waveform 66 is a sinusoidally modulated suppressed carrier error signal containing azimuth and elevation error information.

The sum signal $E_s$ which is the reference signal is of the form $$E_s = K \sin \omega_x t \qquad (2)$$

where $K =$ peak amplitude.

The sum signal $E_s$ is then combined with the error signal $E_o$ in the hybrid junction 72.

Figure 10:
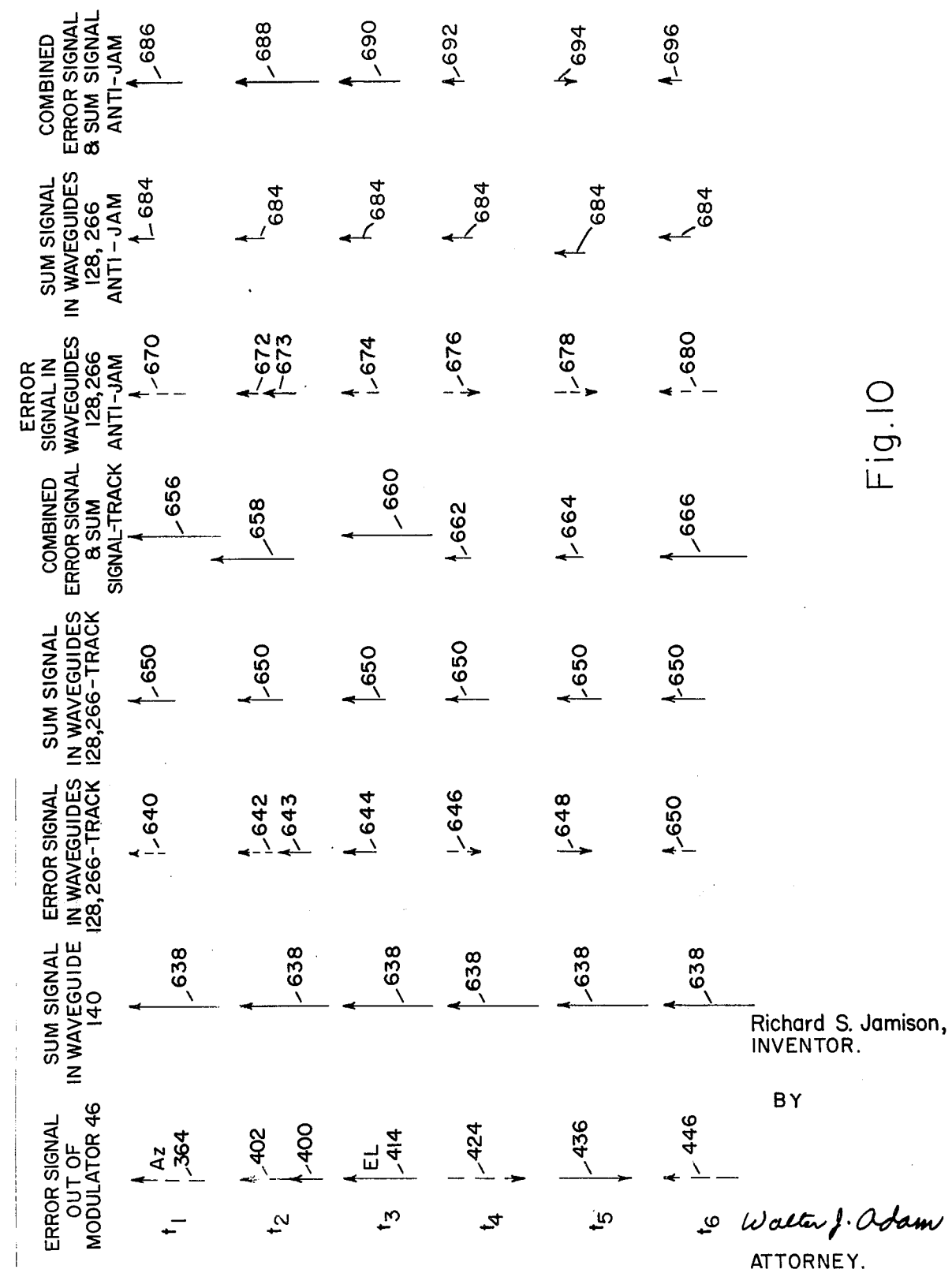
FIG. 10 is a diagram of electrical vectors for explaining the operation of the systems of FIGS. 1 and 2 during tracking and anti-jam operation.

Referring now to the schematic vector diagram of FIG. 10 as well as to FIGS. 5 and 7, tracking and anti-jam operation will be explained in further detail. The error signals accepted by the waveguide 64 at the output of the modulator 46 are shown by electrical vectors 364, 402 and 400, 414, 424, 436 and 446 at respective times $t_1$ to $t_6$ as explained relative to FIG. 5. The sum signal in the waveguide 140 applied to the hybrid junction 72 is shown in FIG. 10 by a vector 638 at times $t_1$ through $t_6$ having the same amplitude. It is to be noted that the error signal vectors are for a condition of substantially equal elevation and azimuth error with the dotted vectors representing azimuth and the solid line arrows representing elevation. For the conventional track operation with the aperture of the hybrid junctions 72 and 104 respectively opened and closed, the elevation and azimuth error signals in the waveguides 128 or 266 are reduced substantially one half in power or reduced by three tenths of the voltage amplitude as shown by the electrical vectors 640, 642 and 643, 644, 646, 648 and 650 at respective times $t_1$ to $t_6$. The sum signal in the waveguides 128 or 266 is approximately one half of the power or 7/10 of the input voltage amplitude as shown by vectors 650. The combined error signal and sum signal at times $t_1$ to $t_6$ is shown by respective vectors 656, 658, 660, 662, 664 and 666.

The posts 112 and 114 are withdrawn from the aperture 110 so that both hybrid junctions 72 and 104 are open for anti-jam operation. In this condition utilizing the phase shifter 96 discussed above, for example, approximately one tenth of the sum signal energy and nine tenths of the error signal energy are passed to the waveguides 128 or 266 to provide a combined signal that is principally error signal. Thus for the anti-jam operation, the resultant sum voltage signal is 0.31 of the input amplitude and the resultant error voltage signal is 0.95 of the input amplitude, for example. In the presence of a jammer, it is desirable to increase the percentage of modulation of the error signal so increased error information is provided. The error signal which is substantially nine tenths of the total input error signal energy or 0.95 of the voltage amplitude is shown at times $t_1$ to $t_6$ by respective vectors 670, 672 and 673, 674, 676, 678 and 680. The reflected sum signal is shown by vectors 684 or 0.31 of the input voltage amplitude having substantially equal amplitudes between times $t_1$ to $t_6$. The combined error signal and sum signal as summed in the hybrid junctions 72 and 104 is shown at times $t_1$ to $t_6$ by respective vectors 686, 688, 690, 692, 694 and 696. The period between times $t_1$ to $t_6$ represents an instantaneous error condition which may be corrected by steering the craft, for example, so that the error signals may go to or approach zero. It is to be noted that the system in accordance with this invention is not limited to the amount of attenuation or decoupling discussed above but the plates 95 and 96 may be selected to have desired values in accordance with the principles of this invention.

It is to be also noted that the system in accordance with this invention operates at any desired transmitted radio frequency or microwave frequency such as in the X band and is not to be limited to any particular frequency band.

The summing arrangement in accordance with this invention, including the hybrid junctions, operates equally well with input signals having the same frequency and phase relation. The sideband signals and the carrier signals illustrated are substantially at the same frequency especially when the modulation frequency is very low. Also the error signals and the sum signal may be considered to be substantially in phase because of the small modulation frequency relative to the carrier frequency. It is to be noted that the principles in accordance with this invention include the hybrid summing arrangement summing input signals having substantially the same frequency and phase relation or a different phase relation as well as summing sideband signals and carrier or sum signals.

For a complete description of a terrain avoidance processor as shown in FIGS. 1 and 2 by the reference number 246, reference is made to my above-mentioned copending application. In it also are complete descriptions of a ferrite modulator and a circulator both of which may be used for the respective modulator 46 and the circulators 120, 220, or 286.

Thus there has been described an improved radar system that provides lobing on reception with the lobing frequency being selective or continuously variable. The received error energy is lobed or modulated and selected portions may be combined with selected portions of the sum or reference signal for different types of operations such as tracking or anit-jamming. Means are provided to utilize only the sum signal for search operation. The system provides terrain avoidance processing by alternately inverting only the received elevation error signal. The arrangement of circulators and hybrids in accordance with this invention provides a simplified and highly reliable system for both transmitting and receiving. In the arrangement of FIG. 1, only one circulator is required so as to provide a very small energy loss but two rotary joints are required in systems where the microwave portion is rigidly mounted on the antenna. In the arrangement of FIG. 2, two circulators are provided but the energy passes therethrough a minimum number of times during reception. In the arrangement of FIG. 2, only one rotary joint is required when the microwave portion is fixedly mounted to the antenna.

What is claimed is:

1. A combination comprising a monopulse antenna for intercepting informational signals reflected from objects and having a boresight axis, a sum and difference network coupled to said monopulse antenna, said network having an azimuth error terminal, an elevation error terminal and a sum terminal; a modulator including an input coupler coupled to said azimuth and elevation error terminals for coupling the azimuth and elevation error signals in space quadrature, a modulating section coupled to said input coupler and having field windings for forming a closed field to continually rotate the coupled error signals in response to time varying reference signals in a first mode of operation and to alternately invert the coupled error signals in response to a square wave signal in a mode other than said first operational mode; and; an output coupler coupled to said modulating section to pass error signals through a first plane of acceptance to a first output and to pass signals through a second plane of acceptance to a second output; means coupled to said second output for dissipating substantially all of the energy passing therethrough; a first hybrid junction having a controllable aperture and having first and second input and output terminal; with said first input terminal; coupled to the first output of said output coupler for receiving error signals passing therethrough, a second hybrid junction having a controllable aperture and having first and second input terminals coupled respectively to said first and second output terminals of junction, said second hybrid junction also having first and second output terminals; means independently coupled to said first and second hybrid junctions for selectively opening and closing each aperture thereof; means coupled between said sum terminal and said second input terminal of said first hybrid junction for passing sum signals thereto, said first hybrid junction applying a common signal including first selected portions of said error signals and of said sum signal to the second output terminal of said second hybrid junction when the aperture of said first hybrid junction is opened and the aperture of said second hybrid junction is closed; impedance transforming means coupled between said first and second hybrid junctions for controlling the amplitude and phase of the error signals and of the sum signal when the aperture of said second hybrid junction is open to apply a common signal including second selected portions of said error signals and of said sum signal to the second output terminal of said second hybrid junction, the common signal formed in response to said time varying reference signals applied to said modulating section containing angular tracking information relative to an object and in response to said square wave signal containing time information representative of boresight range to an object; a controllable source of signals coupled to said modulating section for selectively applying thereto said reference signals during said first mode of operation and said square wave signal during said other operational mode; and processing means coupled to the output of said second hybrid junction and to said controllable source of signals for processing said common signal to provide the tracking information when the modulator receives said reference signals and to provide boresight range when said modulator receives said square wave signal.

2. A combination comprising a monopulse antenna for intercepting informational signals reflected from objects and having a boresight axis, a sum and difference network coupled to said monopulse antenna, said network having an azimuth error terminal, an elevation error terminal and a sum terminal; a modulator including an input coupler coupled to said azimuth and elevation error terminals for coupling the azimuth and elevation error signals in space quadrature, a modulating section coupled to said input coupler and having field windings for forming a closed field to continually rotate the coupled error signals in response to a time varying reference signal and to alternately invert the coupled error signals in response to a square wave signal, and an output coupler coupled to said modulating section to pass error signals through a plane of acceptance to an output terminal; a hybrid junction having first and second input and output terminals, with the first input terminal coupled to said output coupler at the output terminal thereof to receive said error signals passing through said plane of acceptance; means coupled between said sum terminal and said second input terminal of said hybrid junction for passing sum signals thereto, said hybrid junction passing a common signal to the second output terminal of said hybrid junction, the common signal formed in response to said reference signals containing angular tracking information relative to an object and in response to said square wave signal containing time information representative of range on the boresight axis to an object; dissipative means coupled to the first output terminal of said hybrid junction; a controllable source coupled to said modulating section for selectively applying said reference signals and said square wave signal to said modulating section, and processing means coupled to the second output terminal of said hybrid junction and to said controllable source for processing said common signal to provide the tracking information when the modulator receives said reference signals and to provide range on the boresight axis when said modulator receives said square wave signal.

3. A system for transmitting unmodulated microwave energy and for selectively providing radar tracking of an object or terrain avoidance operation comprising a monopulse antenna having a boresight axis, a sum and difference network coupled to said monopulse antenna and having an azimuth error terminal, an elevation error terminal and a sum terminal, a modulator including an input coupler coupled to said azimuth and elevation error terminals for coupling azimuth and elevation error signals in space quadrature, a modulating section coupled to said input coupler and having field windings for forming a closed magnetic field to continually rotate the coupled error signals in response to reference signals during tracking operation and for alternately rotating the magnetic field 90° in response to a square wave signal during terrain avoidance operation, an output coupler coupled to said modulating section to pass signals through a first plane of acceptance to a first output terminal and to pass signals through a second plane of acceptance to a second output terminal, the azimuth and elevation signals being applied to the first output terminal amplitude modulated 90° out of phase from each other in response to said reference signals and the elevation signal being applied to the first output terminal alternately inverted in response to said square wave signal, first dissipative means for receiving the signals from said second output terminal, first and second hybrid junctions each having an aperture and having first and second input and first and second output terminals with the first input terminal of said first hybrid junction coupled to the first output terminal of said output coupler and the first and second output terminals of said first hybrid junction respectively coupled to the first and second input terminals of said second hybrid junction, said second hybrid junction including controllable means for opening and closing the aperture thereof, second dissipative means coupled to the first output terminal of said second hybrid junction, means coupled between said sum terminal and the second input terminal of said first hybrid junction for applying a sum signal thereto, means coupled between the first output terminal of said first hybrid junction and the first input terminal of said second hybrid junction for controlling the sum signal and error signal to apply a first summed signal to the second output terminal of said second hybrid junction when the aperture thereof is open during a first tracking operation, said first hybrid junction when the aperture of said second hybrid junction is closed summing the error signals and the sum signal to form a second summed signal during the second tracking operation and to form a third summed signal during terrain avoidance operation, the first and second summed signal containing angular information of an object and the third summed signal containing time information representative of range on the boresight axis, a source of said reference signals coupled to the field windings of said modulating section to provide the continually rotating field, a source of said square wave signals coupled to the field windings of said modulating section to alternately rotate the field 90°, switching means coupled between said sources of reference signals and square wave signals and said field windings to select radar tracking or terrain avoidance operation, a source of transmitting energy coupled to said sum terminal, angular tracking processing means coupled to the second output terminal of said second hybrid junction and to said source of reference signals for separating elevation and azimuth modulation components from said first or second summed signals to determine tracking error during radar tracking operation, and terrain avoidance processing means coupled to the second output terminal of said second hybrid junction and to said signal processing means for responding to the third summed signal to determine range on the boresight axis during terrain avoidance operation.

4. A radar system responsive to unmodulated elevation error signals, azimuth error signals and sum signals comprising a modulator responsive to the elevation and azimuth error signals coupled in space quadrature for rotating said error signals at a predetermined velocity and including a plane of acceptance for polarizing the rotating error signals as modulated error signals, first and second hybrid means each having first and second input and output sections, the first input of said first hybrid means coupled to said modulating means for receiving the modulated error signals, the first and second outputs of said first hybrid means respectively coupled to said first and second inputs of said second hybrid means, said first and second hybrid means each having a pair of movable ports for selectively preventing division of energy therein, a dissipative load coupled to the first output of said second hybrid means, circulating means having first, second, third and fourth ports with the second port responsive to said sum signals, the third port coupled to the second input of said first hybrid means and the fourth port coupled to the second output of said second hybrid means, and signal processing means coupled to the first port of said circulating means.

5. A radar system comprising a monopulse antenna, a sum and difference network coupled to said monopulse antenna and having an azimuth error terminal, an elevation error terminal and a sum terminal, a modulator including an input coupler coupled to said azimuth and elevation error terminals for coupling azimuth and elevation error signals in space quadrature, a modulating section coupled to said input coupler and having field windings for forming a closed magnetic field to continually rotate the coupled error signals in response to reference signals, an output coupler coupled to said modulating section to pass signals through a first plane of acceptance to a first output and to pass signals through a second plane of acceptance to a second output, the azimuth and elevation signals at the second output being amplitude modulated 90° out of phase from each other, means coupled to said first output for dissipating the signals from said first plane of acceptance, first and second hybrid junctions each having first and second input terminals and first and second output terminals with the first input coupled to the second output of said output coupler and the first and second output terminals of said first hybrid junction respectively coupled to the first and second input terminals of said second hybrid junction, each of said hybrid junctions having an aperture therein, a first circulator having first, second, third and fourth ports with the second port coupled to said sum terminal of said sum and difference network, said third port coupled to the second input terminal of said first hybrid junction and said fourth port coupled to the second output terminal of said second hybrid junction, first and second control means respectively coupled to said first and second hybrid junctions for selectively opening and closing the apertures thereof, phase shift means coupled between the first output terminal of said first hybrid junction and the first input terminal of said second hybrid junction, said phase shift means providing a phase shift of signals applied thereto to apply a common signal having first predetermined portions of said sum signal and of said error signal to the second output terminal of said second hybrid junction when the aperture thereof is open in response to said second control means, a dissipative load coupled to the first output terminal of said second hybrid junction said first hybrid junction applying a common signal to the second output terminal of said second hybrid junction having second predetermined portions of said sum signal and of said error signal when the aperture of said second hybrid junction is closed, substantially only said sum signal passing to the second output terminal of said second hybrid junction when the apertures of said first and second hybrid junctions are closed, a source of said reference signals coupled to the field windings of said modulating section to provide the rotating field, a second circulator having first, second and third ports with the second port coupled to the first port of said first circulator, a source of transmitting energy coupled to the first port of said second circulator, and signal processing means coupled to the third port of said second circulator and to said source of reference signals for separating elevation and azimuth modulation components from said common signals when the aperture of said second hybrid junction is either opened or closed and for responding to said sum signal when the apertures of said first and second hybrid junctions are closed.

6. A radar system comprising a monopulse antenna, a sum and difference network coupled to said monopulse antenna and having an azimuth error terminal, an elevation error terminal and a sum terminal, a modulator including an input coupler coupled to said azimuth and elevation error terminals for coupling azimuth and elevation error signals in space quadrature, a modulating section coupled to said input coupler and having field windings for forming a closed magnetic field to continually rotate the coupled error signals in response to reference signals, an output coupler coupled to said modulating section to pass signals through a first plane of acceptance to a first output and to pass signals through a second plane of acceptance to a second output, the azimuth and elevation signals at the second output being amplitude modulated 90° out of phase from each other, dissipative means coupled to said first output for receiving the signals from said first plane of acceptance, first and second hybrid junctions each having first and second input terminals and first and second output terminals with the first input coupled to the second output of said output coupler and the first and second output terminals of said first hybrid junction respectively coupled to the first and second input terminals of said second hybrid junction, each of said hybrid junctions having an aperture therein, a circulator having first, second and third ports with the second port coupled to said sum terminal of said sum and difference network and said third port coupled to the second input terminal of said first hybrid junction, first and second control means respectively coupled to said first and second hybrid junctions for selectively opening and closing the apertures thereof, resistive means coupled between the first output terminal of said first hybrid junction and the first input terminal of said second hybrid junction, said resistive means providing an attenuation of signals applied thereto to apply a common signal having first predetermined portions of said sum signal and of said error signal to the second output terminal of said second hybrid junction when the aperture thereof is open in response to said second control means, a dissipative load coupled to the first output terminal of said second hybrid junction said first hybrid junction applying a common signal to the second output terminal of said second hybrid junction having predetermined second portions of said sum signal and of said error signal when the aperture of said second hybrid junction is closed, substantially only said sum signal passing to the second output terminal of said second hybrid junction when the apertures of said first and second hybrid junctions are closed, a source of said reference signals coupled to the field windings of said modulating section to provide a rotating field, a source of transmitting energy coupled to the first port of said circulator, and signal processing means coupled to the second output terminal of said second hybrid junction and to said source of reference signals for separating elevation and azimuth modulation components from said common signals when the aperture of said second hybrid junction is either opened or closed and for responding to said sum signal when the apertures of said first and second hybrid junctions are closed.

7. A radar system comprising a monopulse antenna, a sum and difference network coupled to said monopulse antenna and having an azimuth error terminal, an elevation error terminal and a sum terminal, a modulator including an input coupler coupled to said azimuth and elevation error terminals for coupling azimuth and elevation error signals in space quadrature, a modulating section coupled to said input coupler and having field windings for forming a closed magnetic field to continually rotate the coupled error signals in response to reference signals, an output coupler coupled to said modulating section to pass signals through a first plane of acceptance to a first output and to pass signals through a second plane of acceptance to a second output, the azimuth and elevation signals at the second output being amplitude modulated 90° out of phase from each other, dissipative means coupled to said first output for receiving the signals from said first plane of acceptance, first and second hybrid junctions each having first and second input terminals and first and second output terminals with the first input coupled to the second output of said output coupler and the first and second output terminals of said first hybrid junction respectively coupled to the first and second input terminals of said second hybrid junction, each of said hybrid junctions having an aperture therein, a circulator having first, second and third ports with the second port coupled to said sum terminal of said sum and difference network and said third port coupled to the second input terminal of said first hybrid junction, first and second control means respectively coupled to said first and second hybrid junctions for selectively opening and closing the apertures thereof, phase shift means coupled between the first output terminal of said first hybrid junction and the first input terminal of said second hybrid junction, said phase shift means providing a phase shift of signals applied thereto so as to apply a common signal having first predetermined portions of the sum signal and of the error signal to the second output terminal of said second hybrid junction when the aperture thereof is open in response to said second control means, a dissipative load coupled to the first output terminal of said second hybrid junction, said first hybrid junction applying a common signal to the second output terminal of said second hybrid junction having second portions of said sum signal and of said error signal when the aperture of said second hybrid junction is closed, substantially only said sum signal passing to the second output terminal of said second hybrid junction when the apertures of said first and second hybrid junctions are closed, a source of said reference signals coupled to the field windings of said modulating section to provide a rotating field, a source of transmitting energy coupled to the first port of said second circulator, and signal processing means coupled to the second output terminal of said second hybrid junction and to said source of reference signals for separating elevation and azimuth modulation components from said common signals when the aperture of said second hybrid junction is either opened or closed and for responding to said sum signal when the apertures of said first and second hybrid junctions are closed.

8. A radar system comprising a monopulse antenna, a sum and difference network coupled to said monopulse antenna and having an azimuth error terminal, an elevation error terminal and a sum terminal, a modulator including an input coupler coupled to said azimuth and elevation error terminals for coupling azimuth and elevation error signals in space quadrature, a modulating section coupled to said input coupler and having field windings for forming a closed magnetic field to continually rotate the coupled error signals in response to reference signals, an output coupler coupled to said modulating section to pass signals through a first plane of acceptance to a first output and to pass signals through a second plane of acceptance to a second output, the azimuth and elevation signals at the second output being amplitude modulated 90° out of phase from each other, dissipative means coupled to said first output for receiving the signals from said first plane of acceptance, first and second hybrid junctions each having first and second input terminals and first and second output terminals with the first input coupled to the second output of said output coupler and the first and second output terminals of said first hybrid junction respectively coupled to the first and second input terminals of said second hybrid junction, each of said hybrid junctions having an aperture therein, a first circulator having first, second, third and fourth ports with the second port coupled to said sum terminal of said sum and difference network, said third port coupled to said second input terminal of said first hybrid junction and said fourth port coupled to the second output terminal of said second hybrid junction, first and second control means respectively coupled to said first and second hybrid junctions for selectively opening and closing the apertures thereof, resistive means coupled between the first output terminal of said first hybrid junction and the first input terminal of said second hybrid junction, said resistive means providing an attenuation of signals applied thereto the apply a common signal having first predetermined portions of sum signal and of error signal to the second output terminal of said second hybrid junction when the aperture thereof is open in response to said second control means, dissipative load coupled to the first output terminal of said second hybrid junction said first hybrid junction applying a common signal to the second output terminal of said second hybrid junction having a second proportion of sum signal and of error signal when the aperture of said second hybrid junction is closed, substantially only said sum signal passing to the second output terminal of said second hybrid junction when the apertures of said first and second hybrid junctions are closed, a source of said reference signals coupled to the field windings of said modulating section to provide the rotating field, a second circulator having first, second and third ports with the second port coupled to the first port of said first circulator, a source of transmitting energy coupled to the first port of said second circulator, and signal processing means coupled to the third port of said second circulator and to said source of reference signals for separating elevation and azimuth modulation components from said common signals when the aperture of said second hybrid junction is either opened or closed and for responding to said sum signal when the apertures of said first and second hybrid junctions are closed.

9. A radar system for transmitting microwave energy having unmodulated voltage amplitudes from a transmitting means and for intercepting the energy from a target comprising antenna means for developing sum, elevation and azimuth signals at microwave frequency in response to the energy intercepted from said target, said signals having given directions of polarization and having relative voltage amplitudes indicative of the direction of said target from said antenna means, first coupling means for coupling the elevation and azimuth signals so that their directions of polarization are in orthogonal planes, modulating means coupled to said first coupling means for continually rotating at a selected velocity the directions of polarization of the coupled elevation and azimuth signals, a source of reference signals coupled to said modulating means for selecting the velocity of rotation, second coupling means coupled to said modulating means for accepting the rotating elevation and azimuth signals in a fixed plane of acceptance to provide amplitude modulated elevation and azimuth signals in phase quadrature relative to each other, first and second hybrid junctions each having an aperture and first and second input terminals and first and second output terminals, the first input terminal of said first hybrid junction coupled to said second coupling means, the second output terminal of said first hybrid junction coupled to the second input terminal of said second hybrid junction, a first phase shifter coupled between the first output terminal of said first hybrid junction and the first input terminal of said second hybrid junction, controllable first and second means coupled respectively to said first and second hybrid junctions for opening or closing the apertures thereof, a dissipative load coupled to the first output terminal of said second hybrid junction, a first circulator having first, second, third and fourth ports, a second circulator having first, second and third ports, the second port of said first circulator coupled to said antenna means for passing the transmitted microwave energy and for receiving the sum signal, a second phase shifter coupled between the third port of said first circulator and the second input terminal of said first hybrid junction, the second output terminal of said second hybrid junction coupled to the third port of first circulator, said first port of said first circulator coupled to the second port of said second circulator, said first port of said second circulator coupled to the transmitting means, mixing means coupled to the third port of said second circulator, and detecting means coupled to said mixing means and to said source of reference signals for developing output signals having characteristics representative of the relative amplitudes of the sum, elevation and azimuth signals when the aperture of said first hybrid junction is open and the aperture of said second hybrid junction is either open or closed, said sum signal being applied to said mixing means when the said apertures of said first and second hybrid junctions are closed, opening and closing the aperture of said second hybrid junction when the aperture of said first hybrid junction is open providing a summed signal of selected portions of said sum signal and of said modulated elevation and azimuth signals.

10. A radar lobing system comprising antenna means for developing from echo signals intercepted from a target a sum signal, an elevation signal and an azimuth signal, said signals being at microwave frequency, the elevation and azimuth signals having relative voltage amplitudes indicative of the direction of said target, modulating means for amplitude modulation the elevation and azimuth signals in phase quadrature relative to each other at a desired modulation frequency in response to reference signals having a frequency proportional to said modulation frequency, said modulating means including means for developing said reference signals, first and second hybrid junctions each having an aperture and first and second input and output terminals with the first input terminal of said first hybrid junction coupled to said modulating means for receiving the modulated azimuth and elevation signals, and the second output terminals of said first hybrid junction respectively coupled to the second input terminals of said second hybrid junction, controllable means connected to said second hybrid junction for selectively opening and closing the aperture thereof, first phase shift means coupled between the first output terminal of said first hybrid junction and the first input terminal of said second hybrid junction, a dissipative load coupled to the first output terminal of said second hybrid junction, a circulator having first, second, third and fourth connections with the second connection receiving said sum signal, second phase shift means coupled between the third connection of said circulator and the second input terminal of said first hybrid junction, said second terminal of said second hybrid junction coupled to the fourth connection of said circulator, said first and second hybrid junctions summing first portions of the modulated azimuth and elevation signals and of the sum signal to a common signal when the aperture of said second hybrid junction is closed and summing second portions of the modulated azimuth and elevation signals and of the sum signal to a common signal when the aperture of said second hybrid junction is open, said common signal being applied to the second output terminal of said second hybrid junction, mixing means coupled to the first connection of the said circulator for heterodyning the common signal to an intermediate frequency signal, and detecting means coupled to said mixer means and to said means for developing said reference signals to respond to said reference signals for separating components of the elevation and azimuth signals from said intermediate frequency signal having characteristics indicative of the direction of said target.

11. A radar lobing system comprising antenna means for developing from echo signals intercepted from a target a sum signal, an elevation signal and an azimuth signal, said signals being at microwave frequency, the elevation and azimuth signals having relative voltage amplitudes indicative of the direction of said target, modulating means for amplitude modulation the elevation and azimuth signals in phase quadrature relative to each other at a desired modulation frequency in response to reference signals having a frequency proportional to said modulation frequency, said modulating means including means for developing said reference signals, first and second hybrid junctions each having an aperture and first and second input and output terminals with the first input terminal of said first hybrid junction coupled to said modulating means for receiving the modulated azimuth and elevation signals, and the second output terminals of said first hybrid junction respectively coupled to the second input terminals of said second hybrid junction, controllable means connected to said second hybrid junction for selectively opening and closing the aperture thereof, attenuating means coupled between the first output terminal of said first hybrid junction and the first input terminal of said second hybrid junction, a dissipative load coupled to the first output connection of said second hybrid junction, a circulator having first, second, third and fourth connections with the second connection receiving said sum signal, phase shift means coupled between the third connection of said circulator and the second input terminal of said first hybrid junction, said second terminal of said second hybrid junction coupled to the fourth connection of said circulator, said first and second hybrid junctions summing first portions of the modulated azimuth and elevation signals and of the sum signal to a common signal when the aperture of said second hybrid junction is closed and summing second portions of the modulated azimuth and elevation signals and of the sum signal to a common signal when the aperture of said second hybrid junction is open, said common signal being applied to the second output terminal of said second hybrid junction, mixing means coupled to the first connection of the said circulator for heterodyning the common signal to an intermediate frequency signal, and detecting means coupled to said mixer means and to said means for developing said reference signals to respond to said reference signals for separating components of the elevation and azimuth signals from said intermediate frequency signal having characteristics indicative of the direction of said target.

12. A system for determining range on the boresight axis of monopulse antenna means to an object in an elevation plane, said antenna receiving energy from the object with an upper and a lower lobe comprising sum and difference means coupled to said antenna means and having elevation and azimuth difference terminals and a sum terminal, a circulator having first, second, third and fourth ports with the second port coupled to said sum terminal, a source of pulses coupled to said first port for transmitting a pulse of signals at a transmitting frequency during each of a plurality of sequential time periods from said antenna means to the object, said antenna means intercepting the pulses reflected from said object and said sum and difference means applying elevation and azimuth difference signals and a sum signal to corresponding terminals thereof, a modulator having an input coupler coupled to said elevation and azimuth difference terminals for coupling said elevation and azimuth difference signals in space quadrature, having a magnetic field rotating 90° during each time period for alternately inverting the vectors of said elevation and azimuth difference signals during each second time period and having an output coupler for accepting only the elevation vectors, a hybrid junction having first and second input terminals and first and second output terminals, with the first input terminal coupled to said output coupler for receiving the alternately inverted elevation difference signals, the second input terminal coupled to the third port of said circulator and the second output terminal coupled to the fourth port of said circulator, a dissipative load coupled to the first output terminal of said hybrid junction, said hybrid junction summing predetermined portions of the sum signal and predetermined portions of the alternately inverted difference signals to a combined signal, alternate pulses of said combined signal representing a resultant upper lobe of the upper lobe combined with the sum signal and a resultant lower lobe of the lower lobe combined with the sum signal, mixing means coupled to the first port of said circulator, detecting means coupled to said mixing means for forming video pulses alternately representing the resultant upper and lower lobes, and processing means coupled to said mixing means for determining a time substantially centered between the time of occurrence of the resultant upper and lower lobe video pulses representative of range on the boresight axis.

13. A combination for modulating first and second microwave signals to provde a resultant signal and for summing predetermined portions of the resultant signal with a third microwave signal to develop a summed signal comprising, a modulator including an input coupler for coupling the first and second signals in space quadrature, a modulating section coupled to said input coupler and responsive to control signals to provide a magnetic field to rotate the coupled first and second signals, and an output coupler coupled to said modulating section and having first and second output terminals with orthogonal planes of acceptance, said second output terminal of said output coupler receiving said resultant signal modulated at a frequency determined by said control signals; dissipative means coupled to the first output terminal of said output coupler to receive that component of said resultant signal that is polarized in one of said planes of acceptance; a hybrid junction having first and second input and output terminals with the first input terminal coupled to the second output terminal of said output coupler to receive the other component of said resultant signal that is polarized in the other of said planes of acceptance; means coupled to the second input terminal of said hybrid junction for applying the third signal to said hybrid junction, said hybrid junction applying said summed signal of the resultant signal to the second output terminal thereof; and a source of said control signals coupled to said modulating section to control the field thereof and the modulating frequency of said resultant signal.

* * * * *

UNITED STATES PATENT OFFICE
CERTIFICATE OF CORRECTION

Patent No. 3,962,705　　　　　　　　　Dated　June 8, 1976

Inventor(s)　　Richard S. Jamison

It is certified that error appears in the above-identified patent and that said Letters Patent are hereby corrected as shown below:

Claim 1, Column 23, line 13, delete ";" after "and".

line 21, delete ";" after terminal, first occurrence, and insert therefor "s".

line 21, delete ";" after "terminals".

line 23, dleete ";" after there-through and insert ",".

line 26, after "of" insert -- said first hybrid --.

line 28, before "means" insert -- control --.

Claim 8, Column 29, line 25, delete "the" after "thereto" and insert -- to --.

Claim 13, Column 34, lines 6 and 7, delete "of the resultant signal".

Signed and Sealed this

Thirteenth Day of December 1977

[SEAL]

Attest:

RUTH C. MASON　　　　　　　　LUTRELLE F. PARKER
*Attesting Officer*　　　　*Acting Commissioner of Patents and Trademarks*